United States Patent
Winkler et al.

(10) Patent No.: US 11,702,992 B2
(45) Date of Patent: Jul. 18, 2023

(54) COMBUSTOR WALL CORE WITH RESONATOR AND/OR DAMPER ELEMENTS

(71) Applicant: Raytheon Company, Waltham, MA (US)

(72) Inventors: Julian Winkler, Glastonbury, CT (US); Kenji Homma, Glastonbury, CT (US); Craig A. Reimann, Vernon, CT (US); Jeffrey M. Mendoza, Manchester, CT (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/541,758

(22) Filed: Dec. 3, 2021

(65) Prior Publication Data
US 2023/0175440 A1  Jun. 8, 2023

(51) Int. Cl.
*F23R 3/00* (2006.01)
*F02C 7/24* (2006.01)
*F02C 7/16* (2006.01)

(52) U.S. Cl.
CPC ............ *F02C 7/24* (2013.01); *F02C 7/16* (2013.01); *F23R 3/002* (2013.01); *F23R 3/005* (2013.01); *F23R 2900/00014* (2013.01)

(58) Field of Classification Search
CPC ....... B32B 2307/10; F01N 1/023; F01N 1/04; F02C 7/045; F02C 7/16; F02C 7/24; F05D 2260/96; F05D 2260/963; F05D 2260/964; F23R 3/002; F23R 3/005; F23R 2900/00014
See application file for complete search history.

(56) References Cited

U.S. PATENT DOCUMENTS

| | | | |
|---|---|---|---|
| 7,076,956 B2 | 7/2006 | Young | |
| 7,311,175 B2 | 12/2007 | Proscia | |
| 10,371,381 B2 | 8/2019 | Xu | |
| 10,724,739 B2 | 7/2020 | Kim | |
| 10,823,409 B2 | 11/2020 | Bertoldi | |
| 2006/0153685 A1* | 7/2006 | Bol | C23C 28/3455 416/224 |

(Continued)

OTHER PUBLICATIONS

Urzay, "Supersonic Combustion in Air-Breathing Propulsion Systems for Hypersonic Flight", Annu. Rev. Fluid Mech. 2018. 50:593-627.

*Primary Examiner* — Scott J Walthour
(74) *Attorney, Agent, or Firm* — Getz Balich LLC

(57) ABSTRACT

An engine assembly includes a combustor wall with a first skin, a second skin, a core and a sound attenuation passage. The first skin forms a peripheral boundary of a combustion volume on a first side of the combustor wall. The second skin forms a peripheral boundary of a plenum on a second side of the combustor wall. The core includes a plurality of resonator elements between the first skin and the second skin. A first resonator element includes a first base and a plurality of first protrusions projecting out from the first base. Each first protrusion includes a first bore fluidly coupled with a first cavity within the first base. The sound attenuation passage extends within the core and is fluidly coupled with the combustion volume through an attenuation passage aperture in the first skin. The sound attenuation passage is fluidly decoupled from the plenum by the second skin.

13 Claims, 18 Drawing Sheets

(56) References Cited

U.S. PATENT DOCUMENTS

| | | | |
|---|---|---|---|
| 2012/0237786 A1* | 9/2012 | Morrison | B22D 19/04 |
| | | | 164/91 |
| 2016/0153658 A1* | 6/2016 | Xu | F02C 7/24 |
| | | | 60/757 |
| 2020/0173287 A1* | 6/2020 | Blank | B22F 12/00 |
| 2021/0372286 A1* | 12/2021 | Chakrabarti | B22F 5/04 |

* cited by examiner

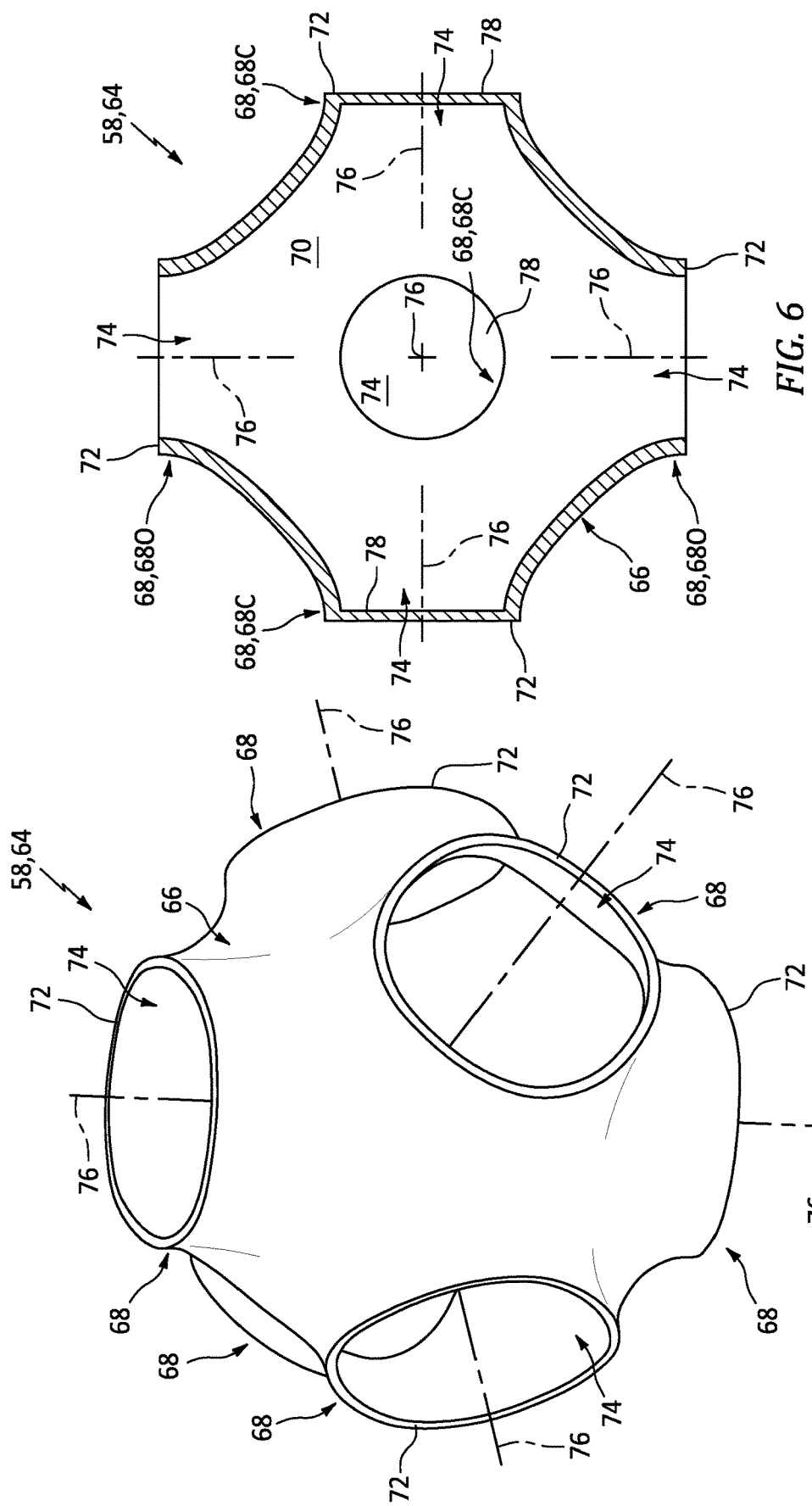

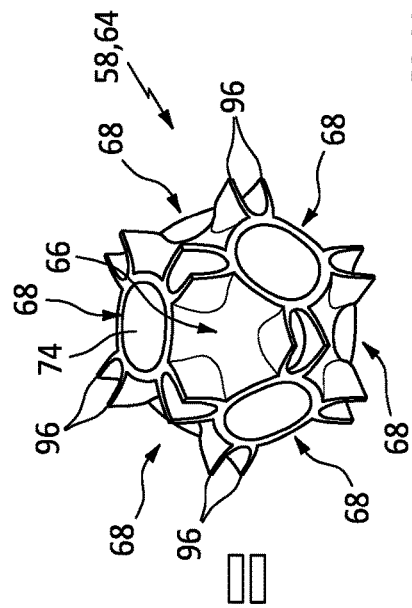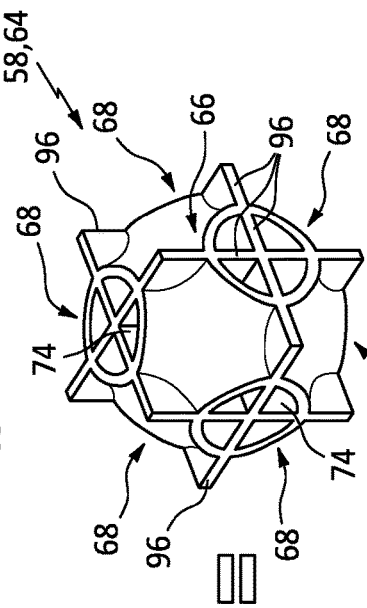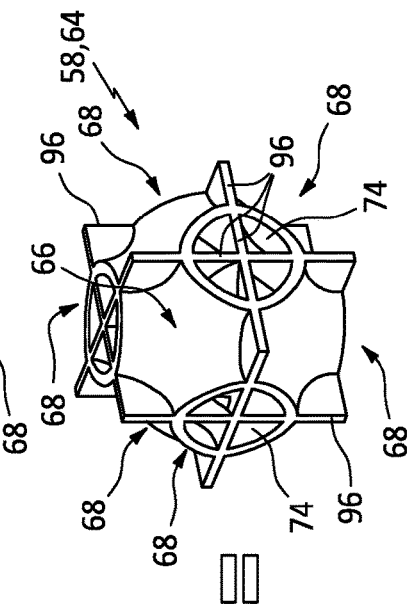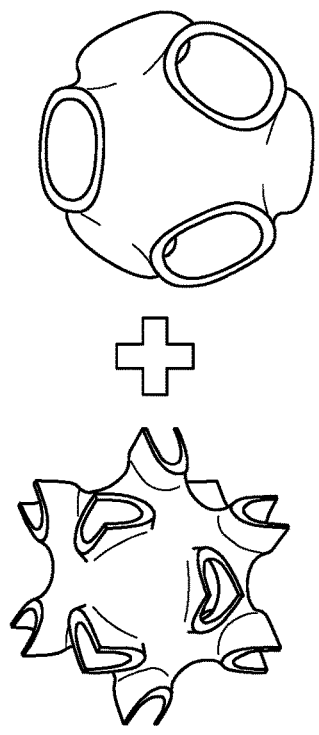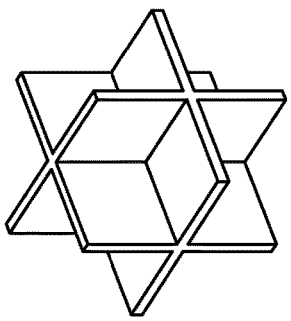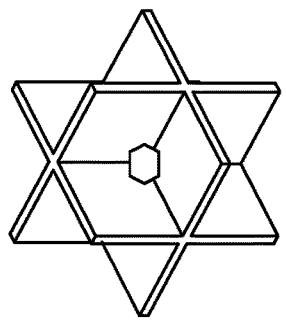
FIG. 11  FIG. 12  FIG. 13

COMBUSTOR WALL CORE WITH RESONATOR AND/OR DAMPER ELEMENTS

BACKGROUND OF THE DISCLOSURE

1. Technical Field

This disclosure relates generally to an engine and, more particularly, to an acoustic attenuation and/or vibration damping structure for the engine.

2. Background Information

A ramjet engine or a scramjet engine with a rotating detonation combustor or a traditional combustor may produce high-amplitude acoustic pressure signals, with either standing waves or waves traveling in an upstream direction and/or a downstream direction. Such acoustic pressure signals can adversely affect operability of the engine. Vibrations from the acoustic pressure signals may also adversely affect operation of engine electronics. There is a need in the art therefore to mitigate effects of acoustic pressure signals within an engine.

SUMMARY OF THE DISCLOSURE

According to an aspect of the present disclosure, an assembly is provided for an engine. This engine assembly includes a combustor wall. The combustor wall includes a first skin, a second skin, a core and a sound attenuation passage. The first skin forms a peripheral boundary of a combustion volume on a first side of the combustor wall. The second skin forms a peripheral boundary of a plenum on a second side of the combustor wall. The core includes a plurality of resonator elements between the first skin and the second skin. The resonator elements include a first resonator element. The first resonator element includes a first base and a plurality of first protrusions projecting out from the first base. Each of the first protrusions includes a first bore fluidly coupled with a first cavity within the first base. The sound attenuation passage extends within the core and is fluidly coupled with the combustion volume through an attenuation passage aperture in the first skin. The sound attenuation passage is fluidly decoupled from the plenum by the second skin.

According to another aspect of the present disclosure, another assembly is provided for an engine. This engine assembly includes a combustor wall. The combustor wall includes a first skin, a second skin, a core and a passage. The core is between the first skin and the second skin. The core includes a plurality of masses embedded within an elastic web. The elastic web is connected to the first skin and the second skin. The elastic web forms a network of open pores within the core. The elastic web is configured from or otherwise includes an elastic material that is different than a material of the masses. The passage extends through the network of open pores to one or more passage apertures in the first skin. The elastic web forms a peripheral boundary of the passage.

According to still another aspect of the present disclosure, another assembly is provided for an engine. This engine assembly includes a combustor wall. The combustor wall includes a first skin, a second skin, a core, a sound attenuation passage and a cooling passage. The first skin forms a peripheral boundary of a combustion volume on a first side of the combustor wall. The second skin forms a peripheral boundary of a plenum on a second side of the combustor wall. The core includes a plurality of bodies configured as a porous interconnected matrix between the first skin and the second skin. The sound attenuation passage extends within the core and is fluidly coupled with an attenuation passage aperture in the first skin. The cooling passage extends through the core and is fluidly coupled with a first skin cooling passage aperture in the first skin and a second skin cooling passage aperture in the second skin. The cooling passage is fluidly discrete from the sound attenuation passage within the combustor wall.

A first of the bodies may include a first base and a plurality of first protrusions projecting out from the first base. Each of the first protrusions may be configured with a first bore fluidly coupled with a first cavity of the first base.

A first of the bodies may include a mass embedded within elastic material.

The sound attenuation passage may extend into the first cavity through the first bore of a first of the first protrusions.

The first resonator element may form a peripheral boundary of the sound attenuation passage outside of the first resonator element.

The combustor wall may also include a cooling passage extending within the core. The cooling passage may be fluidly coupled with the combustion volume through a first skin cooling passage aperture in the first skin. The cooling passage may be fluidly coupled with the plenum by a second skin cooling passage aperture in the second skin.

The sound attenuation passage may extend into the first resonator element. The cooling passage may extend next to and outside of the first resonator element.

The cooling passage may extend into the first resonator element. The sound attenuation passage may extend next to and outside of the first resonator element.

The resonator elements may also include a second resonator element that includes a second base. A second cavity within the second base may be fluidly coupled with the first cavity through the first bore of a second of the first protrusions. A first centerline of the first of the first protrusions may be parallel with a second centerline of the second of the first protrusions.

The resonator elements may also include a second resonator element that includes a second base. A second cavity within the second base may be fluidly coupled with the first cavity through the first bore of a second of the first protrusions. A first centerline of the first of the first protrusions may be angularly offset from a second centerline of the second of the first protrusions.

The resonator elements may also include a second resonator element that includes a second base. A second cavity within the second base may be fluidly coupled with the first cavity through the first bore of a second of the first protrusions. The first bore of the first of the first protrusions has a first size. The first bore of the second of the first protrusions has a second size that may be different than (or alternatively equal to) the first size.

The combustor wall may also include a second sound attenuation passage extending within the core. The second sound attenuation passage may be fluidly coupled with the combustion volume through a second attenuation passage aperture in the first skin. A length of the sound attenuation passage within the combustor wall may be different than a length of the second sound attenuation passage within the combustor wall.

The first resonator element may also include a second protrusion projecting out from the first base and at least one of the first protrusions.

The first resonator element may also include a second protrusion projecting into the first cavity and/or the first bore of a first of the first protrusions.

The core may also include a plurality of damper elements between the first skin and the second skin. The damper elements may include a first damper element. The first damper element may include a first damper base and a plurality of first damper protrusions projecting out from the first damper base. The first damper base may be configured with a first mass and a first shell. The first mass may be within the first damper base and embedded within the first shell.

The first shell may form a peripheral boundary of the sound attenuation passage outside of the first damper element.

The first shell may be configured from or otherwise includes shell material. The first mass may be configured from or otherwise includes mass material. The shell material may be different than or alternatively the same as the mass material.

The damper elements may also include a second damper element. The second damper element may include a second damper base and a plurality of second damper protrusions projecting out from the second damper base. The second damper base may be configured with a second mass and a second shell. The second mass may be within the second damper base and embedded within the second shell. A size of the first mass may be different than a size of the second mass.

The assembly may also include a combustor. This combustor may include the combustor wall. The combustor may be configured as a ramjet combustor or a scramjet combustor.

The core may extend partially along the first skin and/or the second skin.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 5 is a perspective illustration of a core body for the cellular core.

FIG. 6 is a sectional illustration of another core body for the cellular core.

FIGS. 11-13 are perspective illustrations of various structured core bodies and sub-structures that form those core bodies.

DETAILED DESCRIPTION

Figure 1:
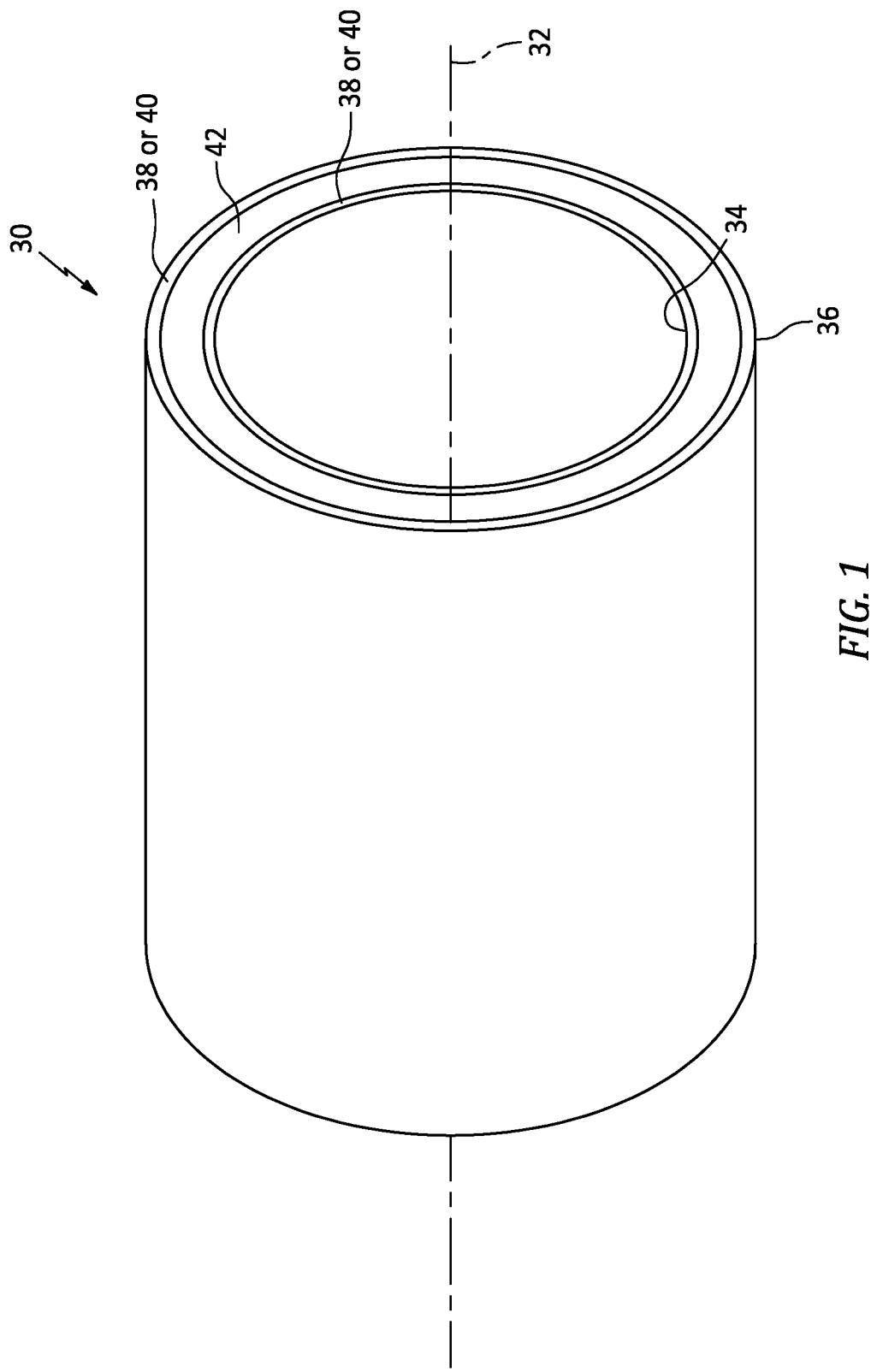
FIG. 1 is a schematic perspective illustration of a combustor wall.

FIG. 1 illustrates a combustor wall 30 for a combustor of an internal combustion (IC) engine. For ease of description, this engine may be described below as a scramjet engine or a ramjet engine for an aircraft propulsion system. The present disclosure, however, is not limited to such exemplary aircraft propulsion system engines, nor to aircraft propulsion system applications in general. The engine, for example, may be configured as any type of engine where fuel is continuously or periodically injected into a chamber or another internal volume (e.g., an open space) for combustion.

The combustor wall 30 of FIG. 1 extends axially along an axial centerline 32 of the combustor wall 30; e.g., an axial centerline of the combustor and/or the engine. The combustor wall 30 extends radially between and to a radial inner surface 34 of the combustor wall 30 and a radial outer surface 36 of the combustor wall 30. The combustor wall 30 extends circumferentially about (e.g., completely around) the axial centerline 32; e.g., thereby providing the combustor wall 30 with a tubular body. Note, while the combustor wall 30 is shown with a circular cross-sectional geometry in FIG. 1, the combustor wall 30 of the present disclosure may alternatively be configured with another non-circular cross-sectional geometry; e.g., an oval cross-sectional geometry, a polygonal cross-sectional geometry, etc. The combustor wall 30 of FIGS. 2 and 3 includes a combustor (e.g., hot side) interior skin 38, a combustor (e.g., cold side) exterior skin 40 and a porous, cellular core 42.

Figure 2:
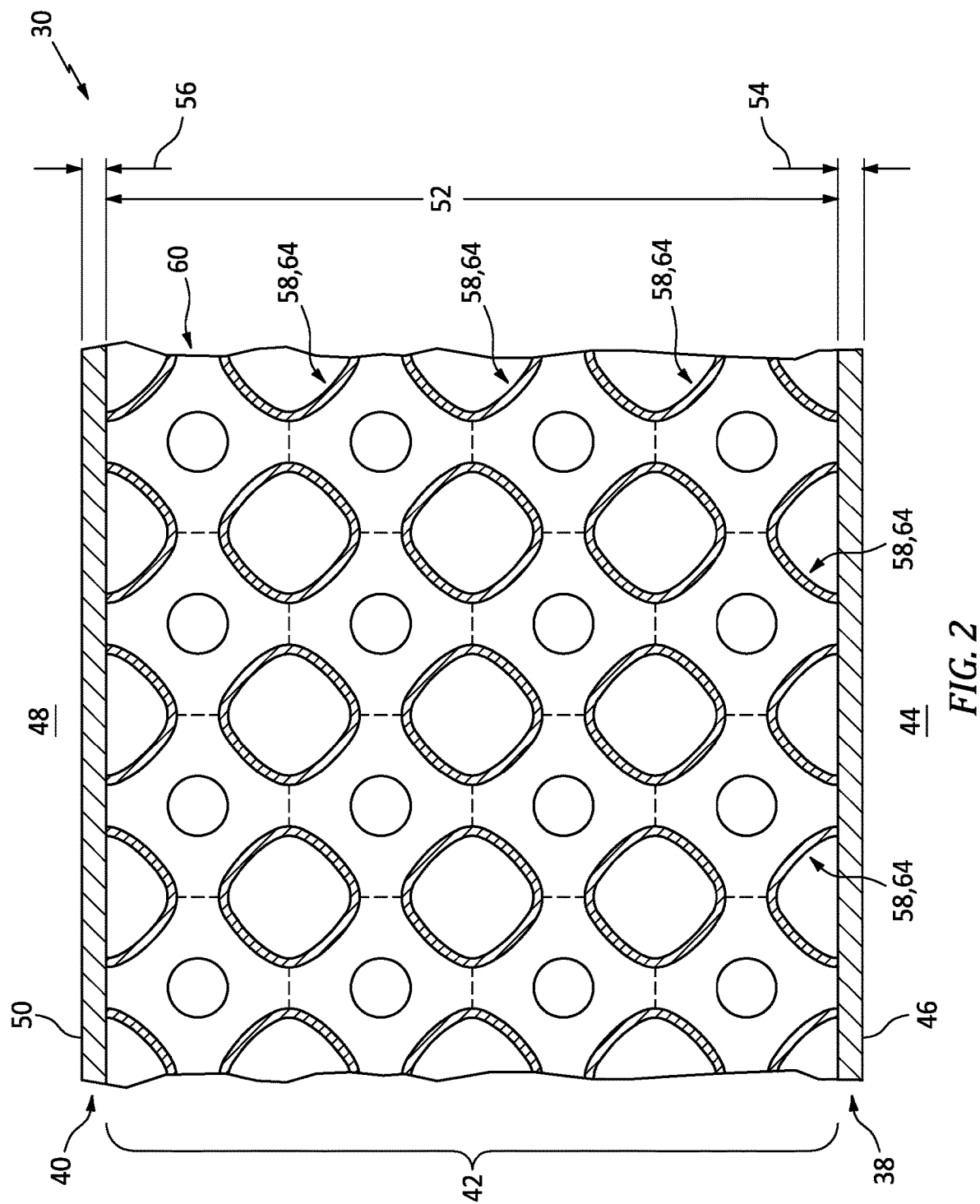
FIG. 2 is a partial cutaway illustration of the combustor wall taken in an axial-radial plane.
Figure 3:
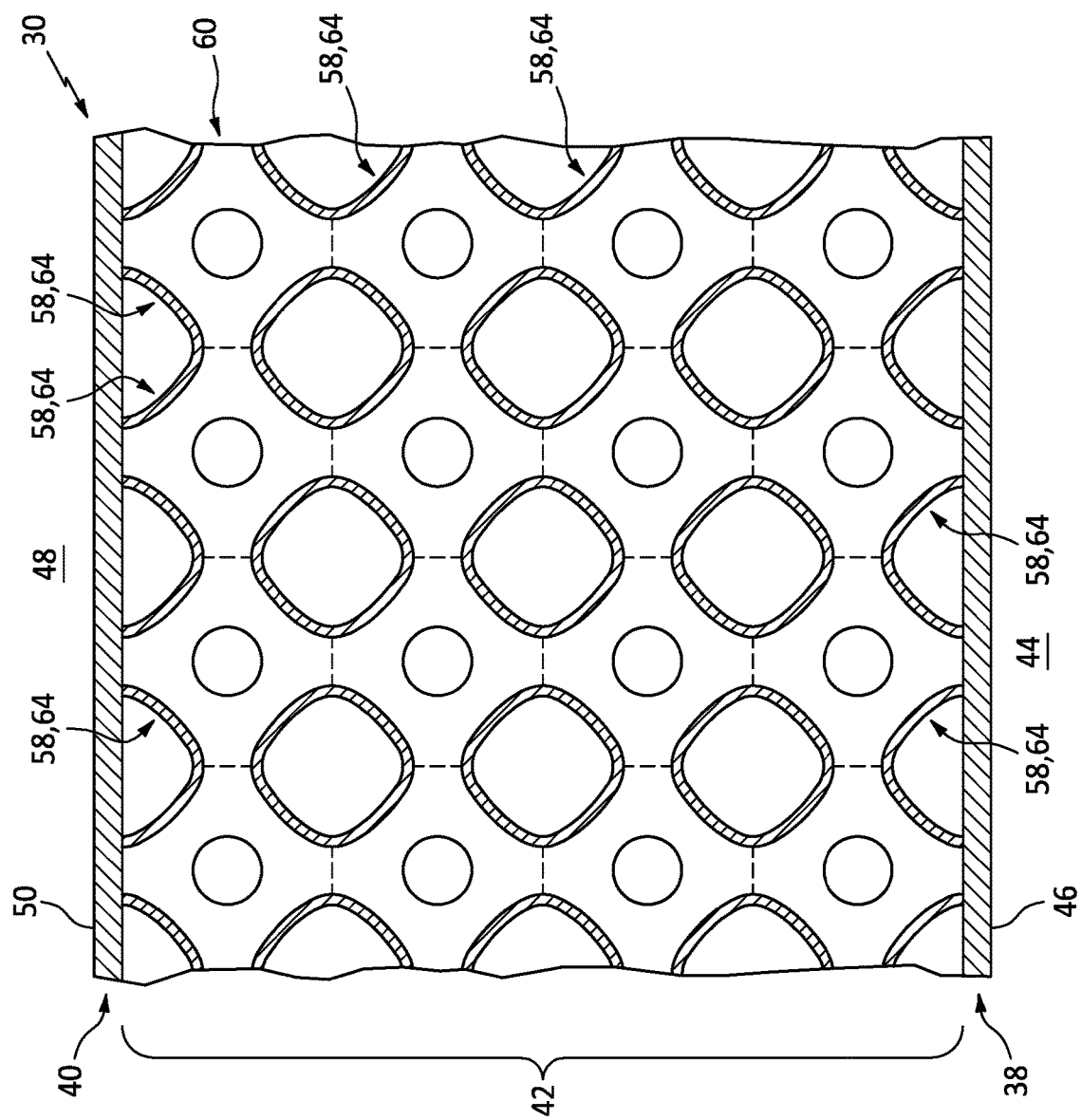
FIG. 3 is a partial cutaway illustration of the combustor wall taken in a circumferential-radial plane.

The interior skin 38 of FIGS. 2 and 3 forms a peripheral boundary of a combustion volume 44 (e.g., a combustion chamber) within the combustor on an interior side 46 of the combustor wall 30. This interior side 46 may form the radial inner surface 34 (see FIG. 1) where the combustor wall 30 is configured as a radial outer wall of the combustor. The interior side 46 may alternatively form the radial outer surface 36 (see FIG. 1) where the combustor wall 30 is configured as a radial inner wall of the combustor. The interior skin 38 of FIG. 1 extends axially along the axial centerline 32. The interior skin 38 of FIG. 2 extends radially from the interior side 46 and its surface 34, 36 (see FIG. 1) to the cellular core 42. The interior skin 38 of FIG. 3 (see also FIG. 1) extends circumferentially about (e.g., completely around) the axial centerline 32.

The exterior skin 40 of FIGS. 2 and 3 forms a peripheral boundary of a combustor plenum 48 (e.g., a cooling cavity, a diffuser, etc.) outside of the combustor on an exterior side 50 of the combustor wall 30. This exterior side 50 may form the radial outer surface 36 (see FIG. 1) where the combustor wall 30 is configured as the radial outer wall of the combustor. The exterior side 50 may alternatively form the radial inner surface 34 (see FIG. 1) where the combustor wall 30 is configured as the radial inner wall of the combustor. The exterior skin 40 of FIG. 1 extends axially along the axial centerline 32. The exterior skin 40 of FIG. 2 extends radially from the exterior side 50 and its surface 38, 40 (see FIG. 1) to the cellular core 42. The exterior skin 40 of FIG. 3 (see also FIG. 1) extends circumferentially about (e.g., completely around) the axial centerline 32.

The cellular core 42 of FIG. 1 extends axially along the axial centerline 32. The cellular core 42 extends circumferentially about (e.g., completely around) the axial centerline 32; see also FIG. 3. The cellular core 42 of FIGS. 2 and 3 extends radially between and to the interior skin 38 and the exterior skin 40. The cellular core 42 may be connected to the interior skin 38 and/or the exterior skin 40. The cellular core 42, for example, may be formed integral with or attached (e.g., welded, brazed, adhered or otherwise bonded) to the interior skin 38 and/or the exterior skin 40.

The cellular core 42 of FIG. 2 has a radial thickness 52 that is substantially larger than a radial thickness 54 of the interior skin 38 and/or a radial thickness 56 of the exterior skin 40. The core thickness 52, for example, may be at least ten to forty times (10-40×) larger than the skin thickness 54, 56. The combustor wall 30 of the present disclosure, however, is not limited to such an exemplary dimensional relationship. For example, the core thickness 52 may alternatively be less than ten times (10×) larger or more than forty times (40×) larger than the skin thickness 54, 56.

Figure 4:
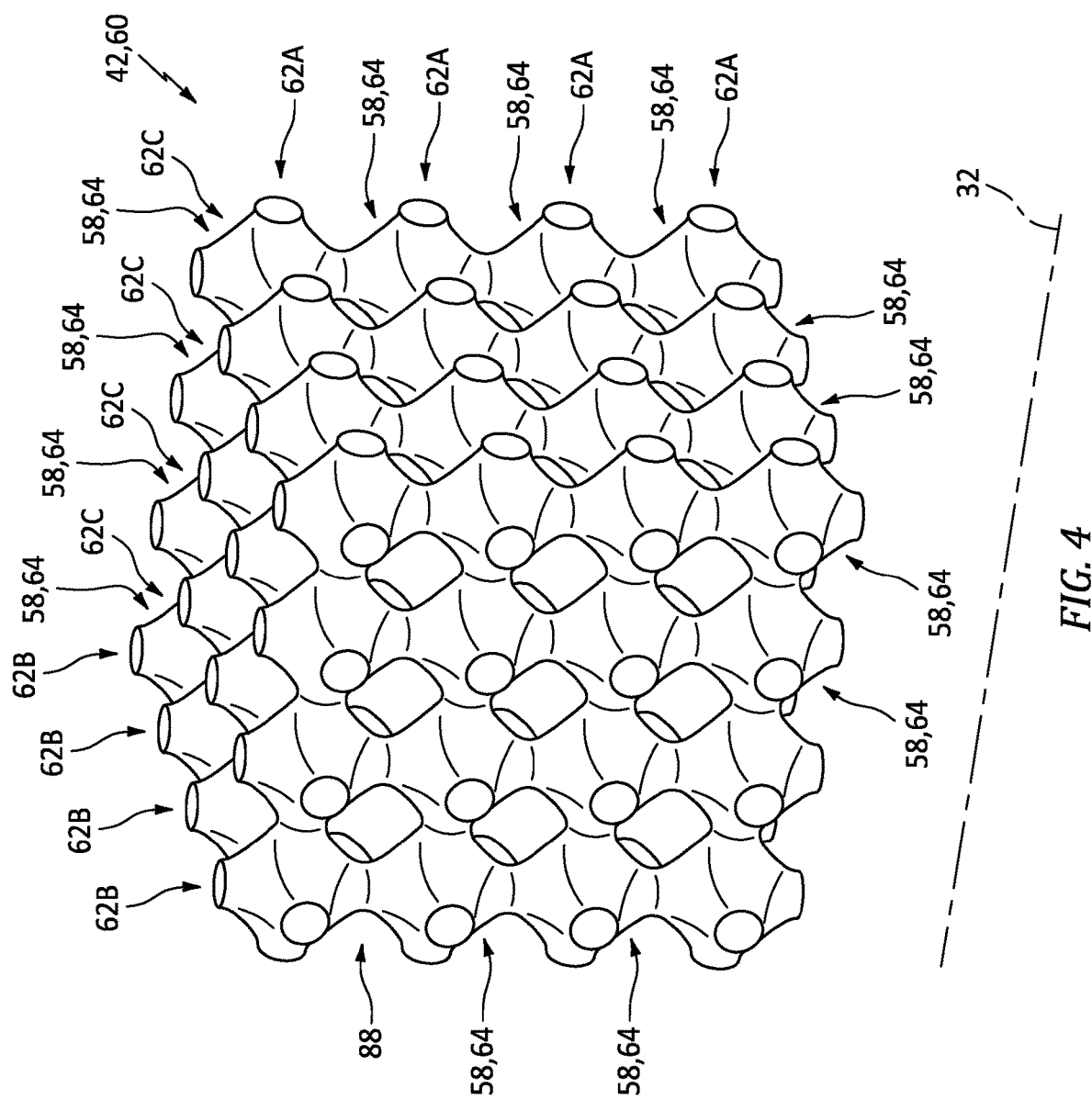
FIG. 4 is a perspective illustration of a portion of a cellular core for the combustor wall.

Referring to FIG. 4, the cellular core 42 includes a plurality of core bodies 58 (e.g., core units) configured together to form a (e.g., three-dimensional (3D)) porous interconnected matrix 60; e.g., a truss, a web, a grid, etc. The core bodies 58 of FIG. 4, for example, are arranged axially side-to-side along the axial centerline 32 in one or more axially extending arrays 62A. The core bodies 58 of FIG. 4 are arranged radially side-to-side in one or more radially extending arrays 62B. The core bodies 58 of FIG. 4 are arranged laterally (e.g., circumferentially, tangentially, etc.) side-to-side about the axial centerline 32 in one or more laterally extending arrays 62C.

One or more or all of the core bodies 58 may each be configured as a sound resonator element 64. For example, referring to FIG. 5, each of the core bodies 58 includes a core body base 66 and one or more core body protrusions 68.

Referring to FIG. 6, the body base 66 may be configured as a hollow member of the respective core body 58. The body base 66 of FIG. 6, for example, is configured as a bulbous (e.g., generally spherical) shell forming an internal body cavity 70 within the body base 66.

The body protrusions 68 are distributed about (see also FIG. 5) the body base 66. Each of the body protrusions 68 is connected to (e.g., is formed integral with or otherwise bonded to) the body base 66. Each of the body protrusions 68 projects out from the body base 66 to a distal end 72 of the respective body protrusion 68. Each of the body protrusions 68 may be configured as another hollow member of the respective core body 58. Each body protrusion 68 of FIG. 6, for example, is configured as a tube forming an internal body bore 74 within the respective body protrusion 68. This body bore 74 is fluidly coupled with the body cavity 70, and projects longitudinally along a longitudinal centerline 76 of the respective body protrusion 68 into (e.g., through) that body protrusion 68. One or more (or all) of the body protrusions 68 (e.g., 68O) may each be open-ended where its body bore 74 extends longitudinally through the respective body protrusion 68. One or more of the body protrusions 68 (e.g., 68C) may each be close-ended where its body bore 74 extends partially longitudinally into the respective body protrusion 68. Each close-ended body protrusion 68C of FIG. 6, for example, is configured with an endwall 78 that caps off/closes its body bore 74.

Figure 7:
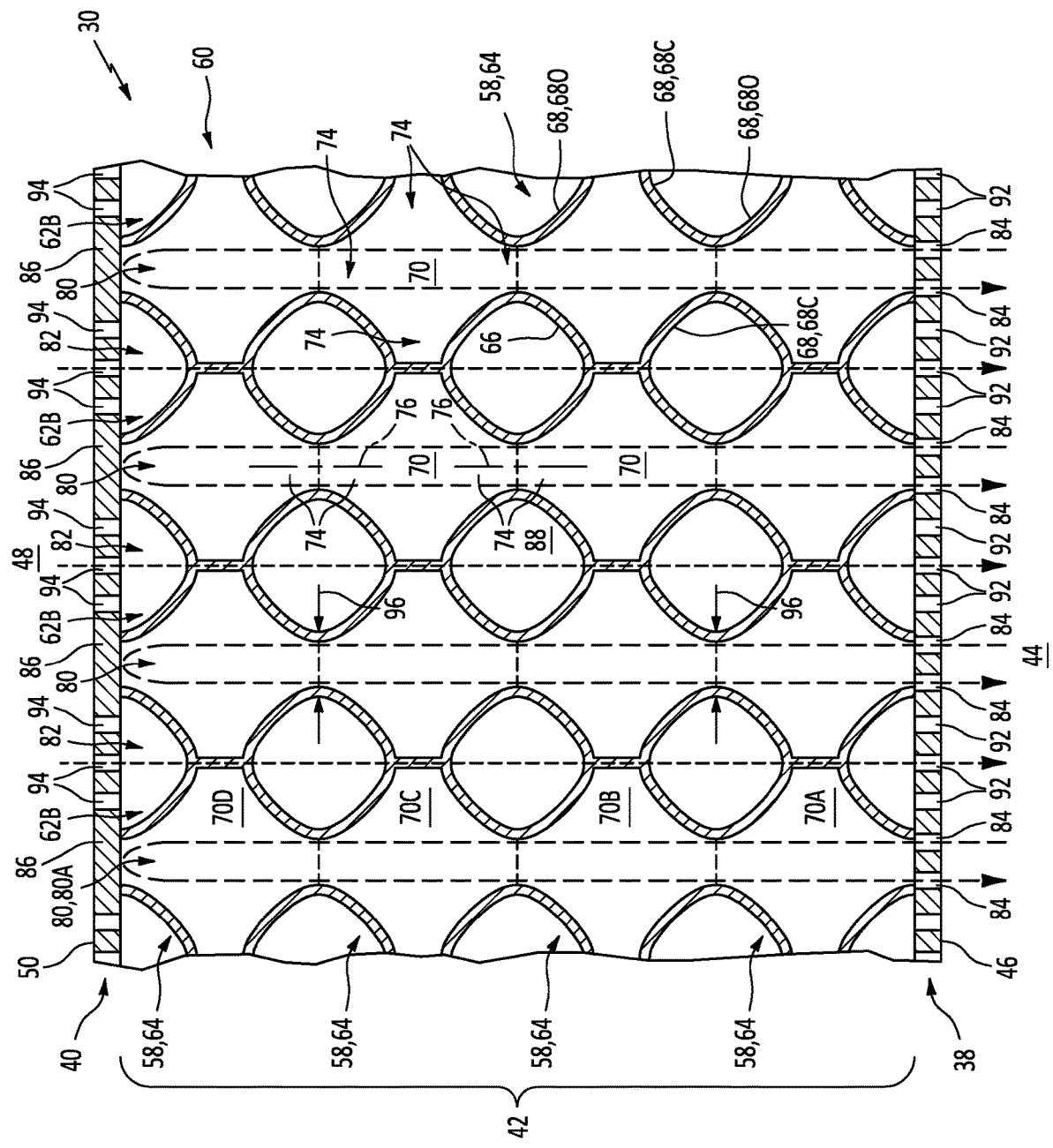
FIG. 7 is a partial sectional illustration of the combustor wall with an arrangement of sound attenuation and cooling passages.

Referring to FIG. 7, each of the core bodies 58 may be connected to (e.g., formed integral with or otherwise bonded to) one or more or all of its neighboring (e.g., axially adjacent, radially adjacent and/or laterally adjacent) core bodies 58. One or more of the core bodies 58 may also be connected to (e.g., formed integral with or otherwise bonded to) the interior skin 38 or the exterior skin 40. Each of the body protrusions 68, for example, may be aligned with and connected to a respective body protrusion 68 of a neighboring core body 58, or one of the combustor wall skins 38, 40.

The core bodies 58 are arranged to provide the cellular core 42 with one or more sound attenuation passages 80. The core bodies 58 of FIG. 7 may also be arranged to provide the cellular core 42 with at least one cooling passage 82.

Each of the sound attenuation passages 80 extends within the cellular core 42 and is fluidly coupled with one or more attenuation passage apertures 84 (e.g., perforations, through-holes, etc.) in the interior skin 38, where each interior attenuation passage apertures 84 extends radially through the interior skin 38. Each of the sound attenuation passage 80 is also fluidly decoupled (e.g., separated, discrete, isolated, etc.) from the combustor plenum 48 by the exterior skin 40. Each sound attenuation passage 80 of FIG. 7, for example, is formed by a respective one of the radially extending arrays 62B of the core bodies 58. More particularly, each sound attenuation passage 80 of FIG. 7 includes a respective set of the interior attenuation passage apertures 84 and the internal volumes 70 and 74 of the core bodies 58 in one of the radially extending arrays 62B. The sound attenuation passage 80A of FIG. 7, for example, extends radially into the combustor wall 30 via the respective interior attenuation passage apertures 84, and sequentially through the body cavities 70A-D to a solid, non-porous (e.g., non-apertured) portion 86 of the exterior skin 40. The core bodies 58 may thereby form a peripheral boundary of each sound attenuation passage 80 within the respective core bodies 58. Here, each sound attenuation passage 80 is a blind passage where fluid (e.g., gas) travels out of the combustor wall 30 the opposite way that fluid traveled into the combustor wall 30.

In the specific arrangement of FIG. 7, each of the body protrusions 68O is open-ended and each of the body protrusions 68C is close-ended. The internal volumes 70 and 74 of the core bodies 58 are thereby respectively fluidly coupled with one another as well as fluidly coupled with the interior attenuation passage apertures 84. The internal volumes 70 and 74, however, are fluidly decoupled from the internal volumes 70 and 74 of the (e.g., axially and/or laterally) surrounding core bodies 58 as well as an internal core chamber 88 (e.g., a plenum, a cavity, etc.) surrounding the core bodies 58. Of course, various other sound attenuation passage routes are possible within the cellular core 42 as discussed below in further detail.

The cooling passage 82 extends within the cellular core 42 and is fluidly coupled with one or more cooling passage apertures 92 (e.g., perforations, through-holes, etc.) in the interior skin 38 and one or more cooling passage apertures 94 (e.g., perforations, through-holes, etc.) in the exterior skin 40, where each interior cooling passage apertures 92 extends radially through the interior skin 38 and each of the exterior cooling passage apertures 94 extends radially through the exterior skin 40. The cooling passage 82 of FIG. 7, for example, is formed by the arrangement of the core bodies 58 within the cellular core 42. More particularly, the cooling passage 82 of FIG. 7 includes the interior cooling passage apertures 92, the exterior cooling passage apertures 94 and the core chamber 88 within which the core bodies 58 are disposed. The cooling passage 82 of FIG. 7, for example, extends radially into the combustor wall 30 via the exterior cooling passage apertures 94, through the core chamber 88, and out of the combustor wall 30 via the interior cooling passage apertures 92. The core bodies 58 may thereby form a peripheral boundary of the cooling passage 82 outside of the core bodies 58.

The combustor wall 30 described above is configured with a single core chamber 88 and, thus, a single passage (e.g., the cooling passage 82) formed by that core chamber 88. However, in other embodiments, it is contemplated the core chamber 88 may be divided into a plurality of sub-chambers via one or more dividers; e.g., baffles, walls, etc. With such an arrangement, each of the sub-chambers may be a part of a separate passage; e.g., cooling passage 82.

During operation, each respective fluidly coupled set of the internal volumes 70 and 74 may operate as one or more resonance chambers for attenuating sound. Sound waves propagating through the combustion volume 44, for example, may enter each sound attenuation passage 80 through the respective interior attenuation passage apertures 84. Some of these sound waves may travel sequentially through the internal volumes 70 and 74 to the exterior skin 40. These sound waves may be reflected by the exterior skin 40 back through the internal volumes 70 and 74 and the respective interior attenuation passage apertures 84 and back into the combustion volume 44, where the reflected sound waves may destructively interfere with other sound waves propagating within the combustion volume 44. Some of the sound waves may also be reflected by one of the core bodies 58 along the passage 80 before reaching the exterior skin 40. The cellular core 42 may thereby be tuned to attenuate a range of frequencies of sound. The cellular core 42, more particularly, may be configured as a multi-degree of freedom (MDOF) attenuating structure; e.g., a four degree of freedom attenuating structure in FIG. 7. The present disclosure, however, in not limited to such an exemplary multi-degree of freedom attenuating structure.

Cooling air is also directed through the cooling passage 82 for cooling the combustor wall 30. The exterior cooling passage apertures 94, for example, direct the cooling air from the combustor plenum 48 into the cooling passage 82. Within the cooling passage 82, the cooling air impinges against and/or otherwise flows about the core bodies 58 thereby cooling those core bodies 58. The interior cooling passage apertures 92 subsequently direct the cooling air out of the cooling passage 82 and into the combustion volume 44. The flow of the cooling air across the interior skin 38 may cool the interior skin 38 via convection. The cooling air directed into the combustion volume 44 may also form a thin film of cooling air along the interior side 46. This film further cools the combustor wall 30 and its interior skin 38 as well as provide a protective barrier between combustion gases within the combustion volume 44 and the interior skin 38.

Figure 8:
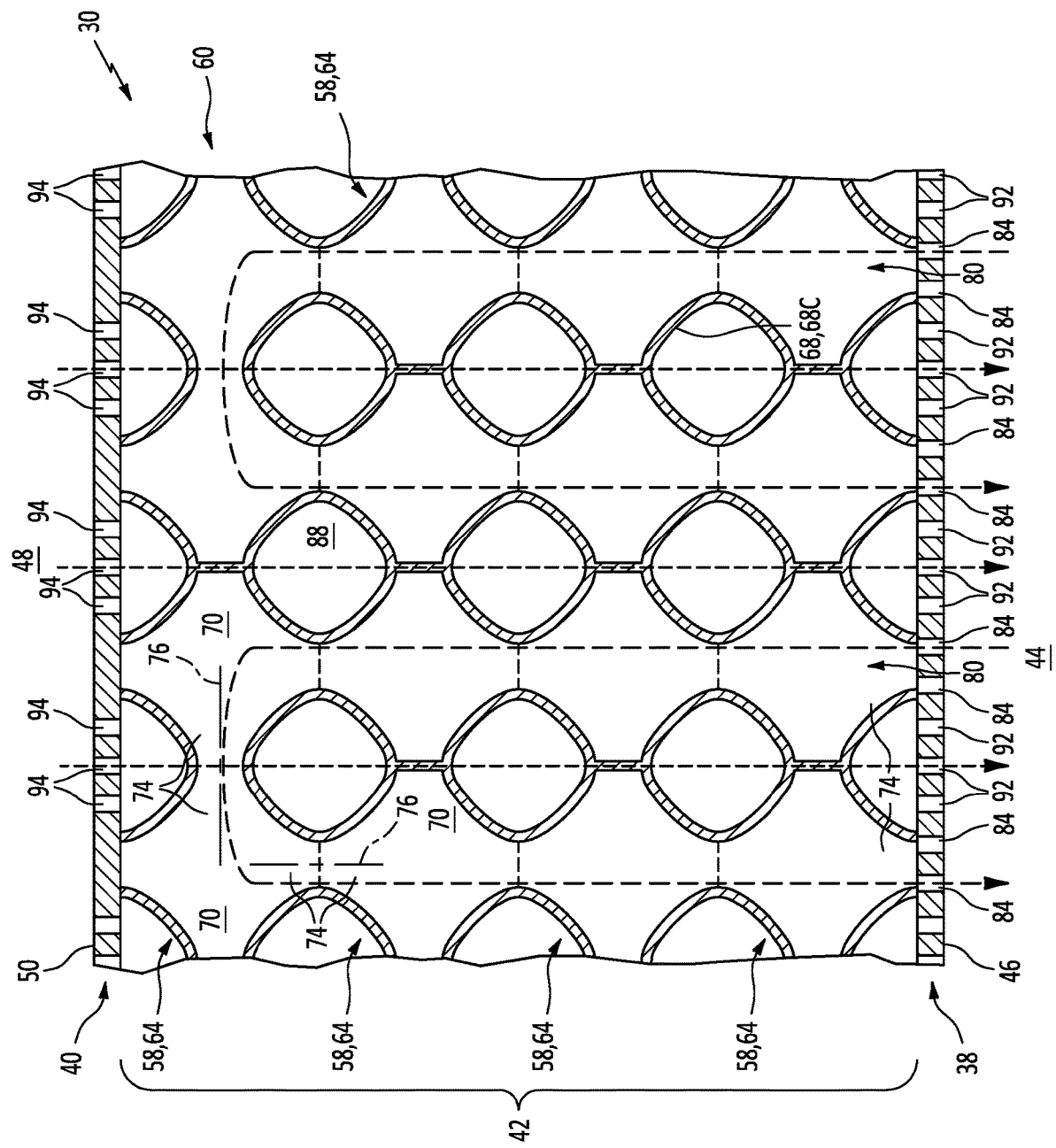
FIG. 8 is a partial sectional illustration of the combustor wall with another arrangement of sound attenuation and cooling passages.

In some embodiments, referring to FIG. 7, the centerlines 76 of the body bores 74 along a common (the same) sound attenuation passage 80 may be parallel (e.g., coaxial) with one another. With this arrangement, sound wave may travel along a straight trajectory through the core bodies 58 along the sound attenuation passage 80. In other embodiments, referring to FIG. 8, the centerlines 76 of some of the body bores 74 along a common (the same) sound attenuation passage 80 may be angularly offset from (e.g., perpendicular to) one another. With this arrangement, sound waves may travel along a non-straight (e.g., a bent, tortuous, etc.) trajectory through the core bodies 58 along the sound attenuation passage 80.

Figure 9:
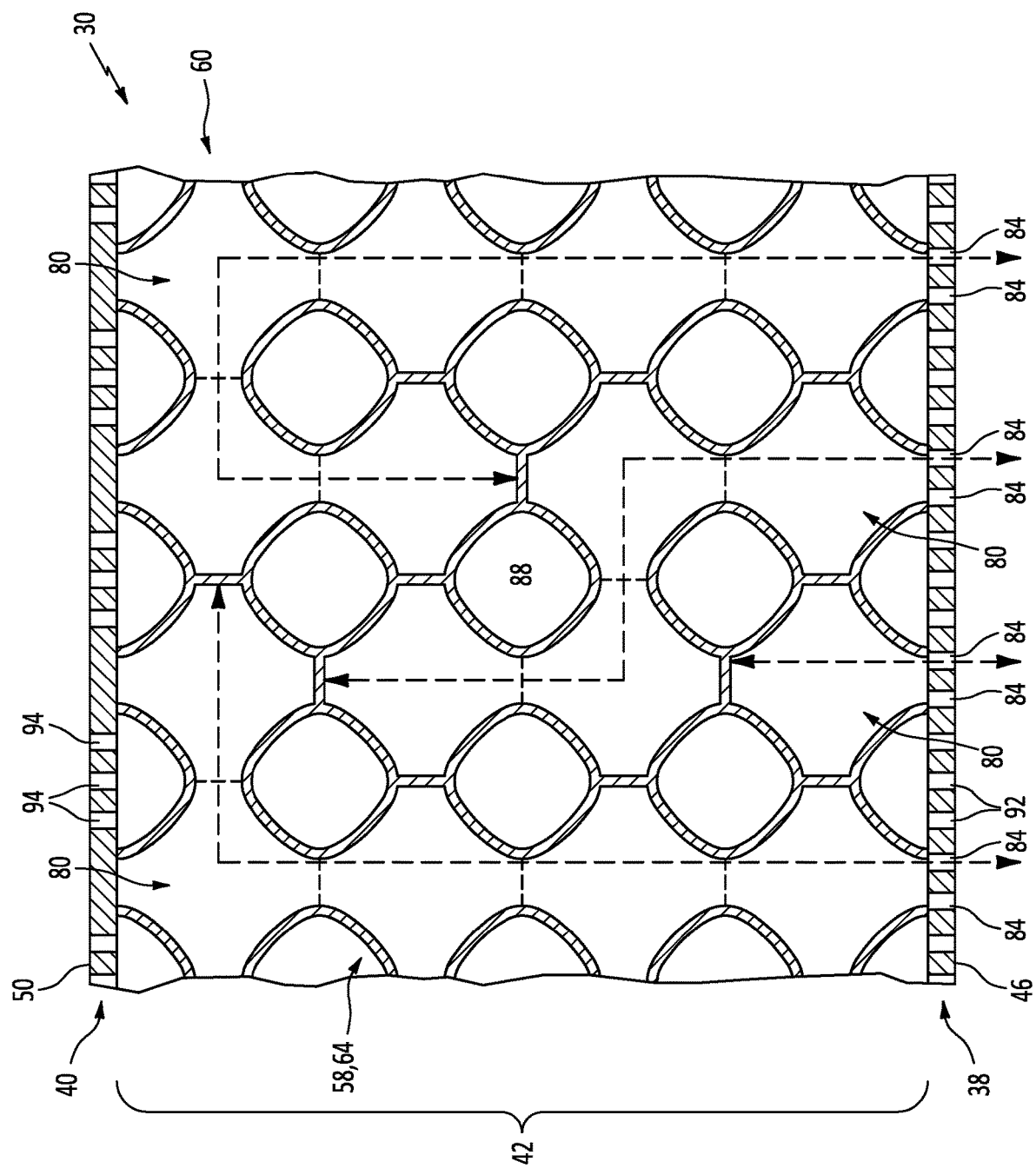
FIG. 9 is a partial sectional illustration of the combustor wall with another arrangement of sound attenuation and cooling passages.

In some embodiments, referring to FIG. 7, one or more or all of the sound attenuation passages 80 may each extend substantially or only radially within the combustor wall 30 and its cellular core 42. In other embodiments, referring to FIGS. 8 and 9, one or more or all of the sound attenuation passages 80 may each further extend axially and/or laterally within the combustor wall 30 and its cellular core 42. With such arrangements, the combustor wall 30 may be tuned to attenuate sound with relatively large frequencies without correspondingly increasing an overall thickness of the combustor wall 30.

In some embodiments, referring to FIG. 7, one or more or all of the sound attenuation passages 80 may each be a dead-end passage. The sound waves, for example, may enter and leave the combustor wall 30 through common (the same) interior attenuation passage apertures 84 and body bore 74. In other embodiments, referring to FIG. 8, one or more or all of the sound attenuation passages 80 may each be a flow-through passage. The sound waves, for example, may enter and leave the combustor wall 30 through different interior attenuation passage apertures 84 and body bores 74.

Figure 10:
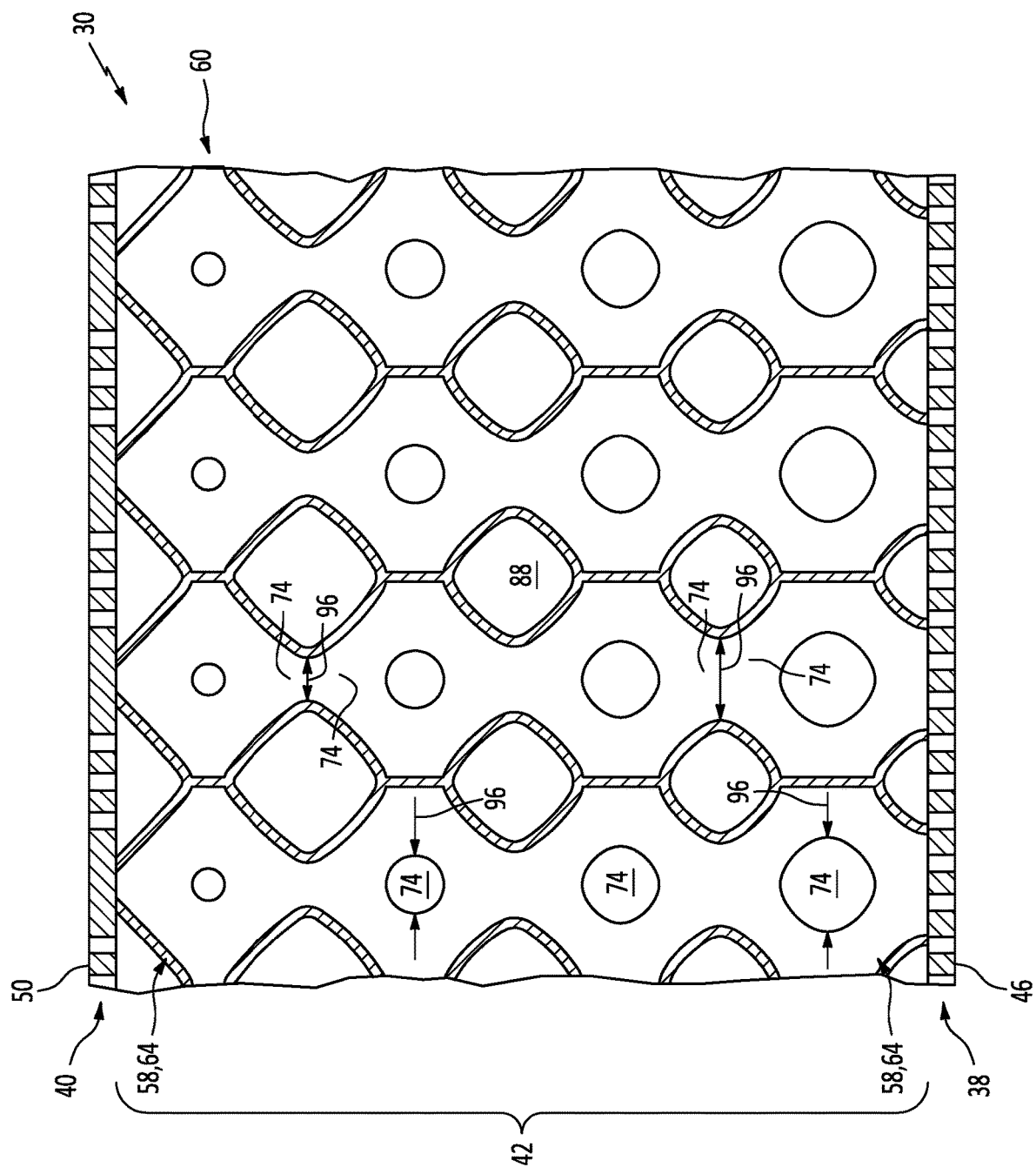
FIG. 10 is a partial sectional illustration of the combustor wall configured with varied core body configurations.

In some embodiments, referring to FIG. 7, a size 96 of the body bore 74 of each body protrusion 68 along a common (the same) sound attenuation passage 80 may be equal. This size 96 may be measured as a width (e.g., a diameter) of the respective body bore 74 at, for example, a choke point for that body bore 74; e.g., a minimum width of the respective body bore 74. In other embodiments, referring to FIG. 10, the size 96 of the body bore 74 of one of the body protrusions 68 may be different than the size 96 of the body bore 74 of another one of the body protrusions 68 along a common (the same) sound attenuation passage 80. For example, the bore sizes 96 may be decreased as the sound attenuation passage 80 extends deeper into the cellular core 42. Such an arrangement may accommodate decreasing flow velocity (e.g., acoustic particle velocity) along the respective sound attenuation passage 80. Body protrusions size may also facilitate control of an acoustic response in presence of a grazing mean flow and/or in presence of high amplitude acoustic waves.

In some embodiments, referring to FIG. 7, one or more or all of the sound attenuation passages 80 may each be configured with a common (the same) longitudinal length within the cellular core 42. In other embodiments, referring to FIG. 9, some or all of the sound attenuation passages 80 may be configured with different longitudinal lengths within the cellular core 42.

In some embodiments, referring to FIG. 5, one or more or each of the core bodies 58 may be configured as a Schwarz-P body. An exterior of the respective core body, for example, may form a Schwarz-P surface. The present disclosure, however, is not limited to such an exemplary configuration; e.g., see FIGS. 11-13.

In some embodiments, referring to FIGS. 11-13, one or more or all of the core bodies 58 may each also include one or more structural protrusions 96; e.g., walls, baffles, flanges, stiffeners, ribs, etc. These structural protrusions 96 may be configured to enhance a structural rigidity and/or strength of the respective core body 58 and, more generally, the cellular core 42. The structural protrusions 96 may also or alternatively be configured to further tune acoustic and/or cooling properties of the cellular core 42. Some of the structural protrusions 96 may be arranged at an exterior of the respective core body 58. Each structural protrusion 96 of FIGS. 11-13, for example, is connected to and projects out from the body base 66 and/or one or more of the body protrusions 68. Referring to FIGS. 12 and 13, some of the structural protrusions 96 may also or alternatively be arranged within an interior of the respective core body 58. Each structural protrusion 96 of FIGS. 12 and 13, for example, projects into (e.g., partially into, or completely across) the cavity 70 (see FIG. 6) and/or one or more of the bores 74.

Figure 14:
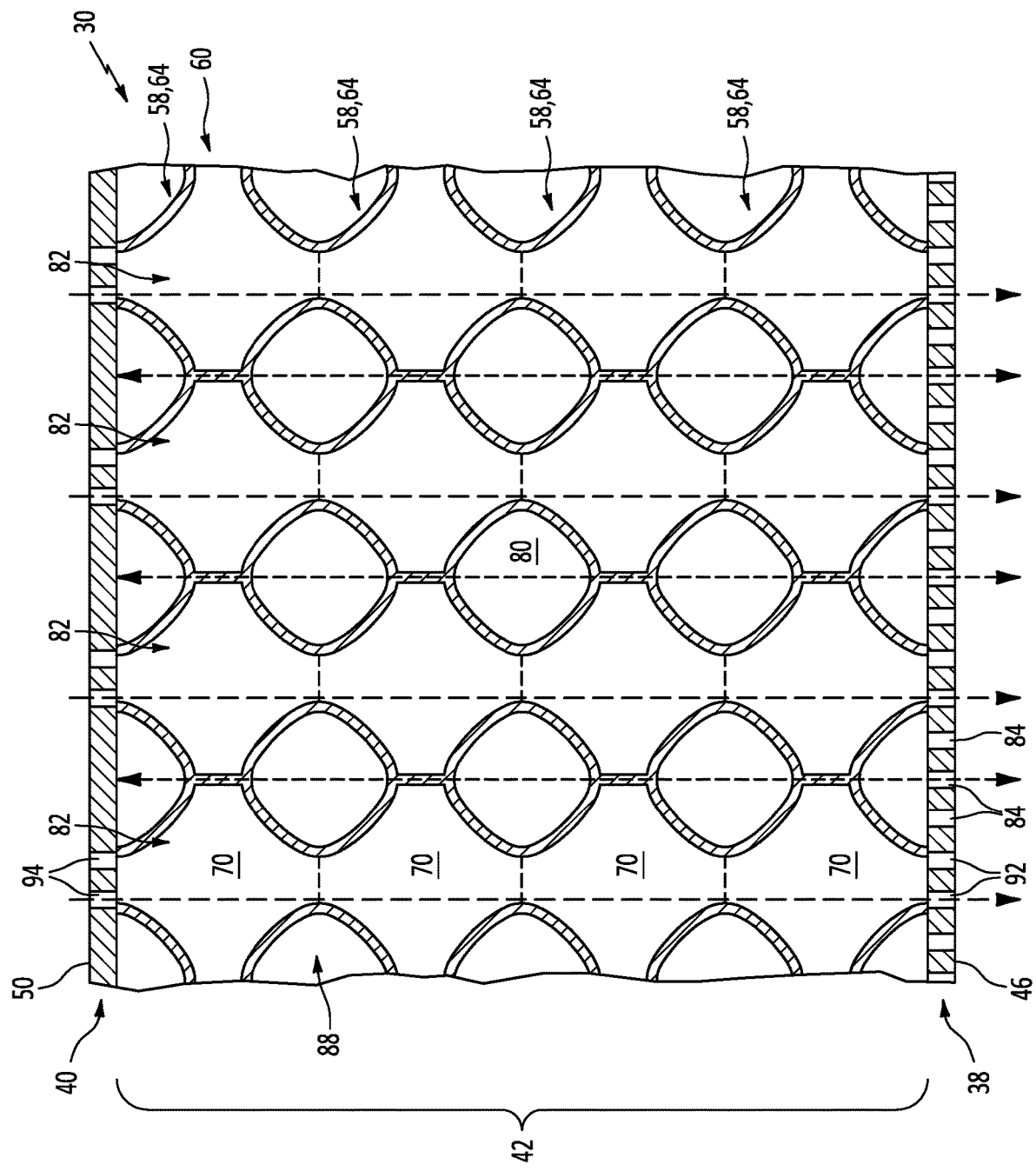
FIG. 14 is a partial sectional illustration of the combustor wall with still another arrangement of sound attenuation and cooling passages.

The sound attenuation passages 80 are described above as extending into/through the core bodies 58, and the cooling passage(s) 82 is(are) described above as extending through the core chamber 88. However, in other embodiments, the arrangement of the passages 80 and 82 may be reversed such that the sound attenuating passage(s) 80 extending through the core chamber 88, and the cooling passages 82 extend through the core bodies 58; e.g., see FIG. 14.

Figure 15A:
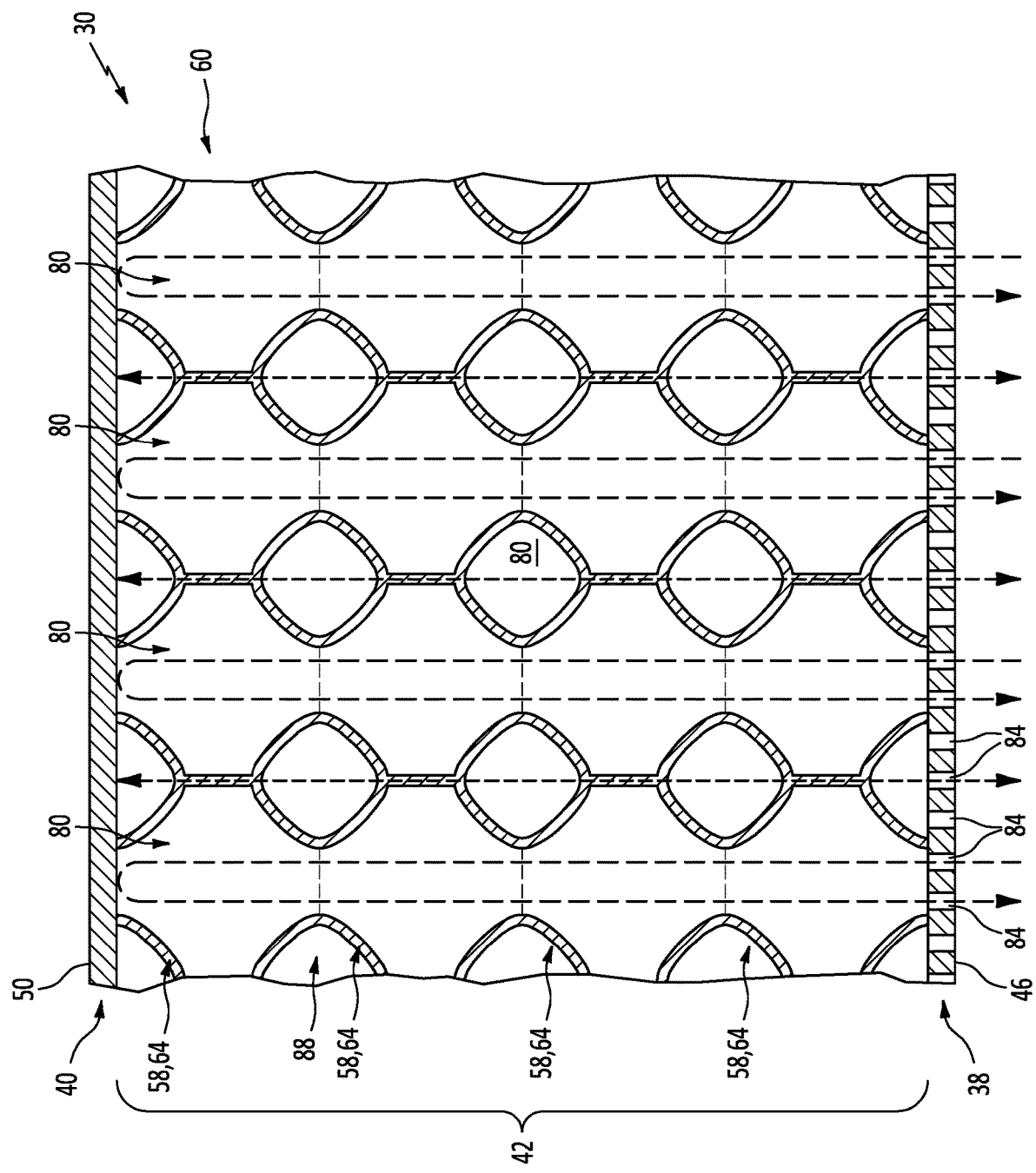
FIG. 15A is a partial sectional illustration of the combustor wall with sound attenuation passages.
Figure 15B:
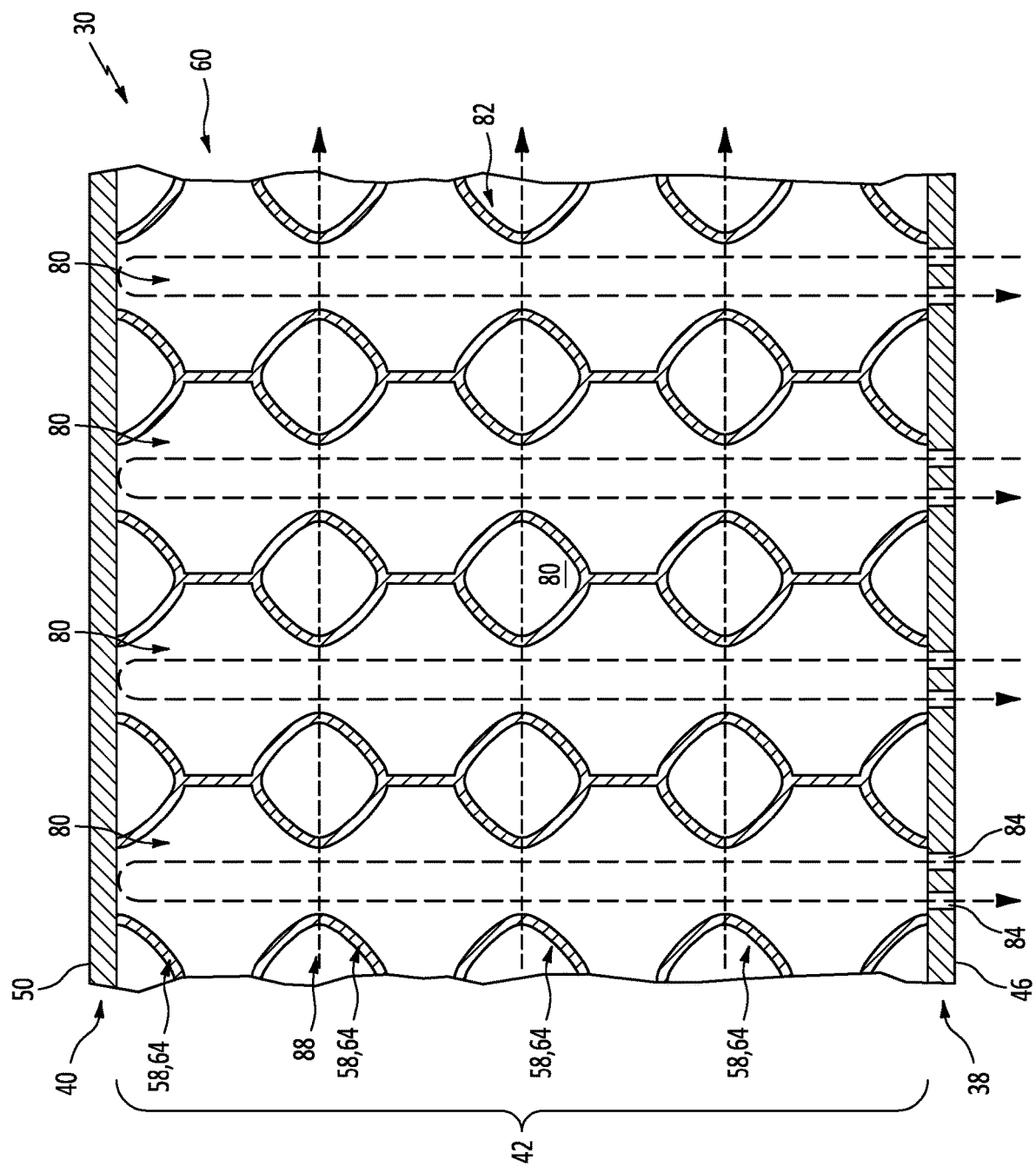
FIG. 15B is a partial sectional illustration of the combustor wall with an axial cooling passage.

In some embodiments, referring to FIG. 15A, the cooling passage(s) 82 may be omitted. The core chamber 88 of FIG. 15A, for example, may also be configured to provide another sound attenuation passage 80. In other embodiments, referring to FIG. 15B, one or more or all of the attenuation passage apertures 84 leading to the core chamber 88 may be omitted. With such an arrangement, at least a portion or an entirety of the core chamber 88 may provide the combustor wall 30 with an axially (horizontally in FIG. 15B) extending cooling passage 82.

Figure 16B:
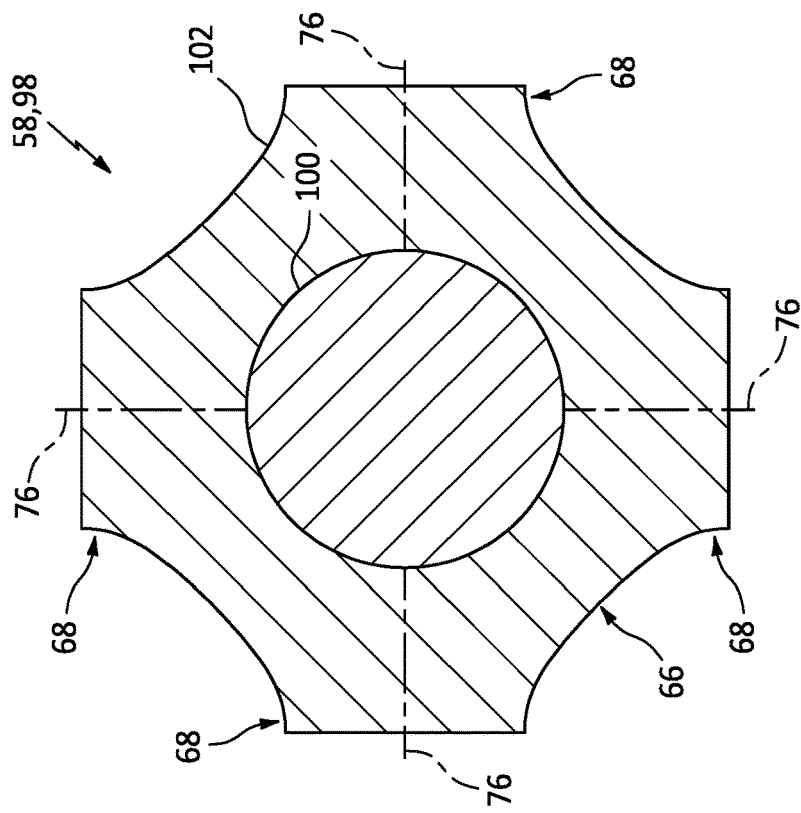
FIG. 16B is a sectional illustration of the damper element of FIG. 16A.
Figure 16A:
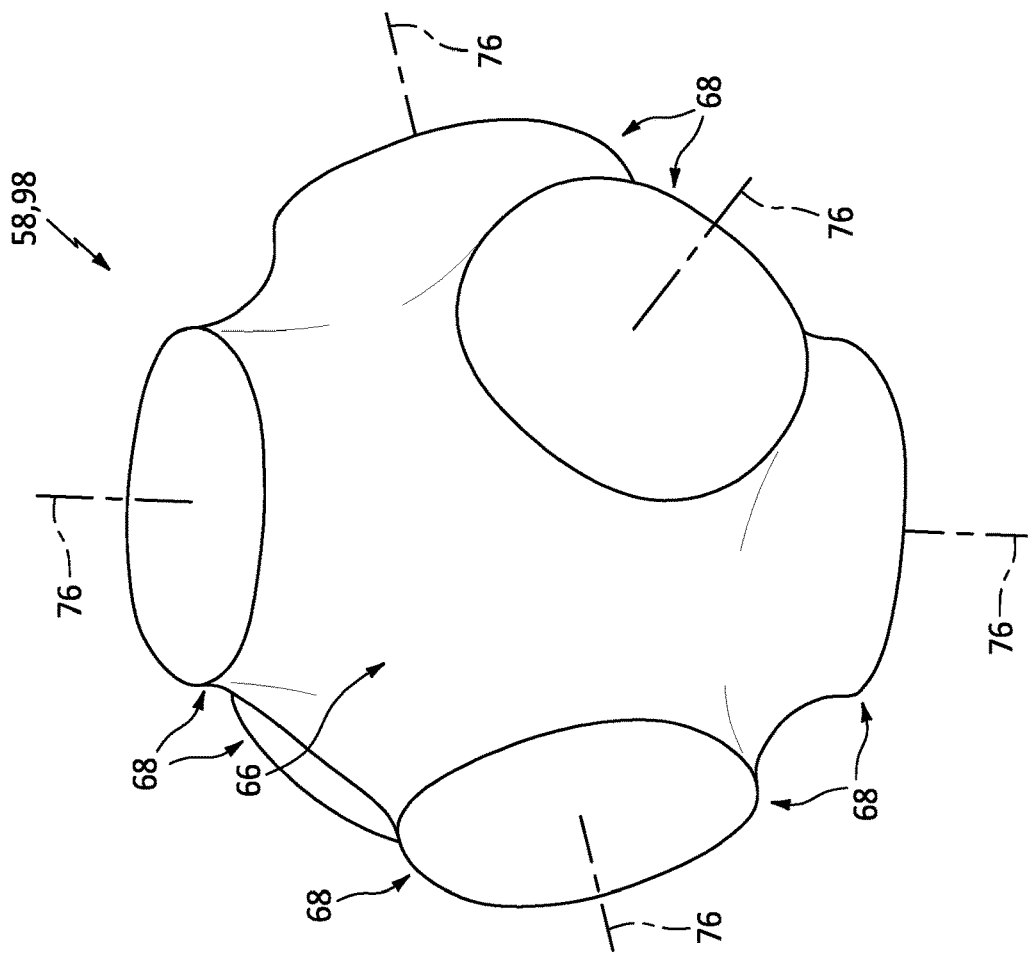
FIG. 16A is a perspective illustration of a core body for the cellular core configured as a damper element.
Figure 17:
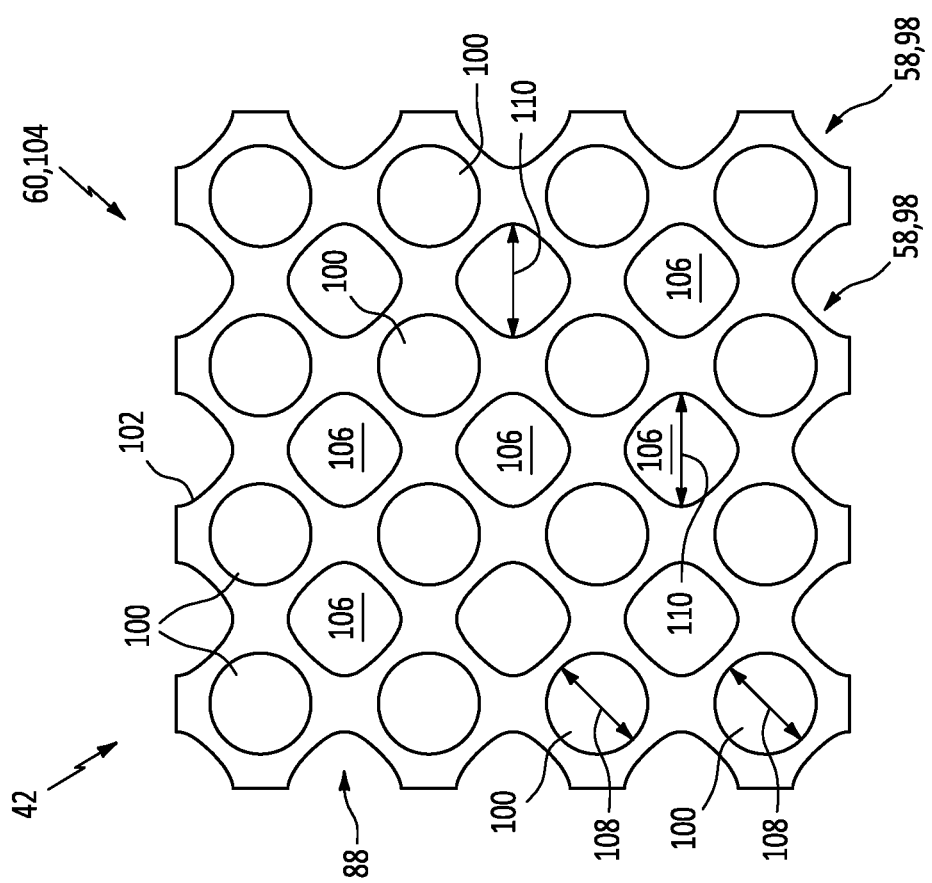
FIG. 17 is a sectional illustration of the cellular core with an arrangement of the damper elements.

In some embodiments, referring to FIGS. 16A and 16B, one or more of all of the core bodies 58 may alternatively be configured as a solid body. The core body 58 of FIG. 16B, for example, is configured as a damper element 98. The core body 58 of FIG. 16B, more particularly, includes a mass 100 and a shell 102. The mass 100 is (e.g., completely) embedded within the shell 102. The mass 100 is disposed within the body base 66. Referring to FIG. 17, the shell 102 forms a web 104 with a network of open pores 106. Referring again to FIG. 16B, the shell 102 forms an outer portion of the body base 66 about (e.g., encasing) the mass 100. The shell 102 also forms one or more or all of the body protrusions 68; e.g., solid protrusions. The shell 102 may be formed from a different material than the mass 100. The shell 102, for example, may be formed from the same material as the mass 100 or from a different material with lower material stiffness. With this arrangement, the core bodies 58 may form vibration dampers within the combustor wall 30.

Figure 18:
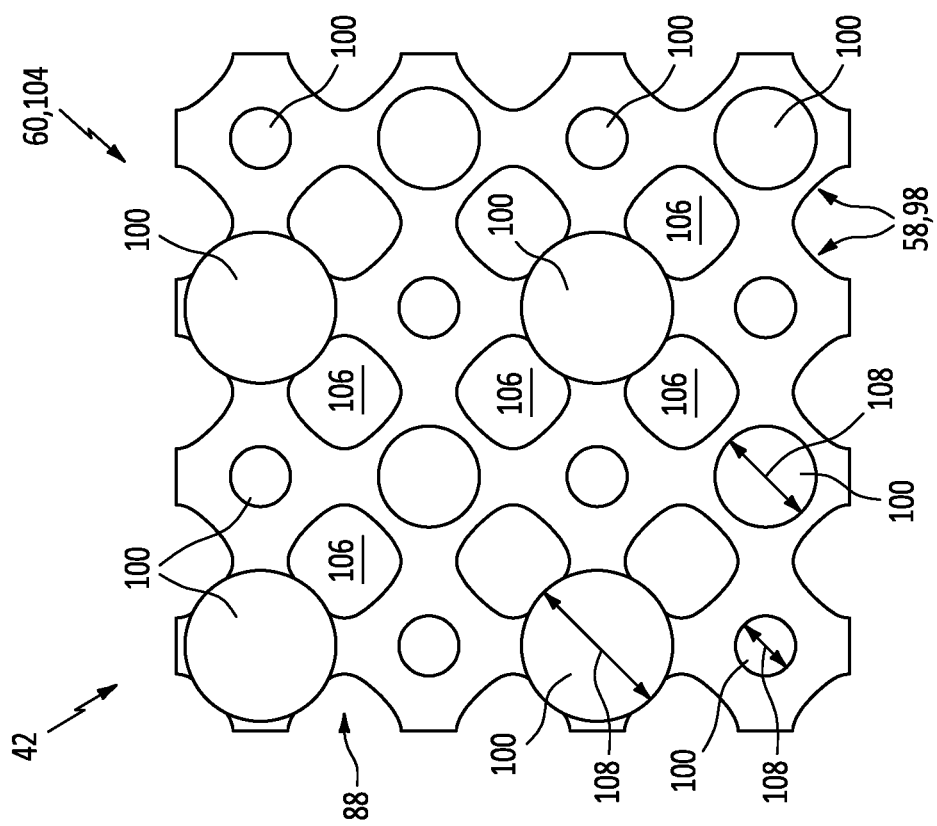
FIG. 18 is a sectional illustration of the cellular core with another arrangement of the damper elements with varied mass sizes.

In some embodiments, referring to FIG. 17, a size 108 of the mass 100 of some or all of the core bodies 58 may be uniform (the same). This size 108 may be measured as a width (e.g., a diameter) of the respective body mass 100. In other embodiments, referring to FIG. 18, the mass size 108 of one or more of the core bodies 58 may be different than the mass size 108 of one or more other core bodies 58. Providing such a differential in mass sizes 108 may tune vibration damping characteristics of the cellular core 42.

Figure 19:
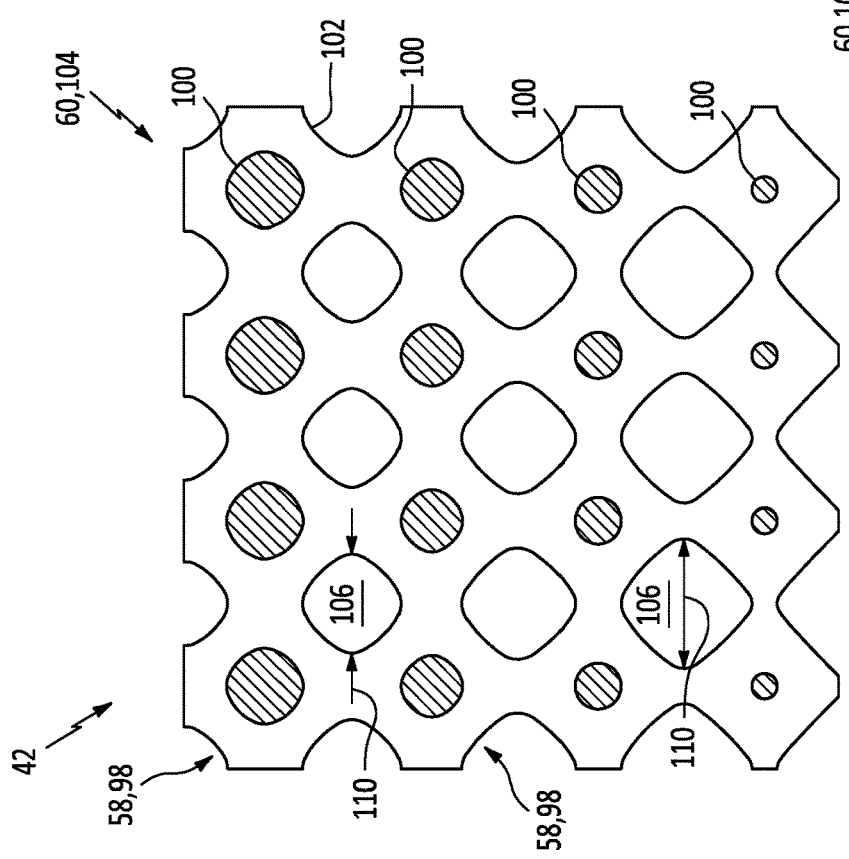
FIG. 19 is a sectional illustration of the cellular core with still another arrangement of the damper elements forming varied inter-element pore sizes.

In some embodiments, referring to FIG. 17, a size 110 of the pore 106 (e.g., an interstice, a pore, etc.) formed between each cluster of the core bodies 58 may be uniform (the same). This size 110 may be measured as a width (e.g., a diameter) of the respective pore 106 at, for example, a choke point through that pore 106; e.g., a minimum width of the respective pore 106. In other embodiments, referring to FIG. 19, the pore size 110 associated with one or more clusters of the core bodies 58 may be different than the pore size 110 of one or more other clusters of the core bodies 58. Providing such a differential in pore sizes 110 may tune acoustic attenuation as discussed above, for example, with respect to FIG. 10.

Figure 20:
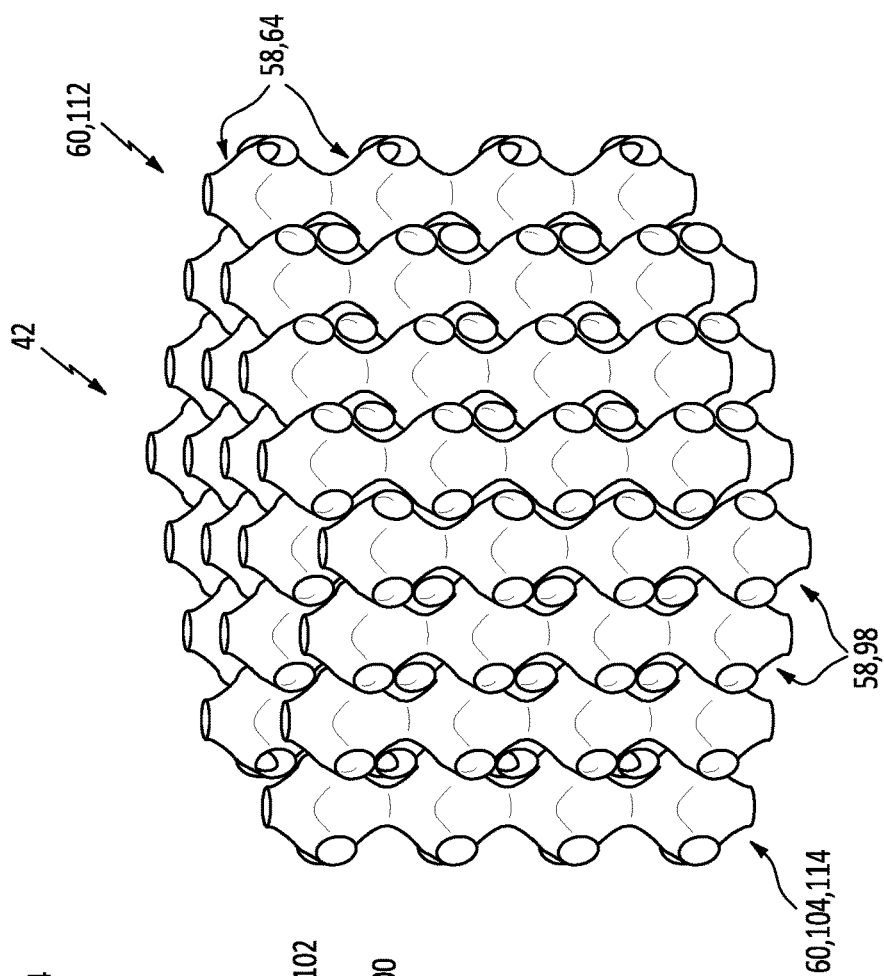
FIG. 20 is a perspective illustration of a portion of the cellular core configured with a structure of resonator elements and a structure of the damper elements.

In some embodiments, referring to FIG. 20, the cellular core 42 may include more than one core structure. The cellular core 42 of FIG. 20, for example, includes a first structure 112 of the resonator elements 64 and a second structure 114 of the damper elements 98, where the resonator elements 64 are interspersed/interposed with the damper elements 98 and the damper elements 98 are interspersed/interposed with the resonator elements 64. One or more or all of the damper elements 98, however, may each be spaced and disengaged from (e.g., not contacting, not directly connected to) one or more or all of the neighboring resonator elements 64. With such an arrangement, the masses 100 are free to vibrate and thereby damp vibrations.

In some embodiments, any one or more or all of volumes (e.g., 70, 74, 88 and/or 106) within the cellular core 42 may each be empty. In other embodiments, any one or more of all of the volumes (e.g., 70, 74, 88 and/or 106) within the cellular core may each be at least partially or completely filled with another material; e.g., a porous material such as open-cell foam, etc.

Figure 21C:
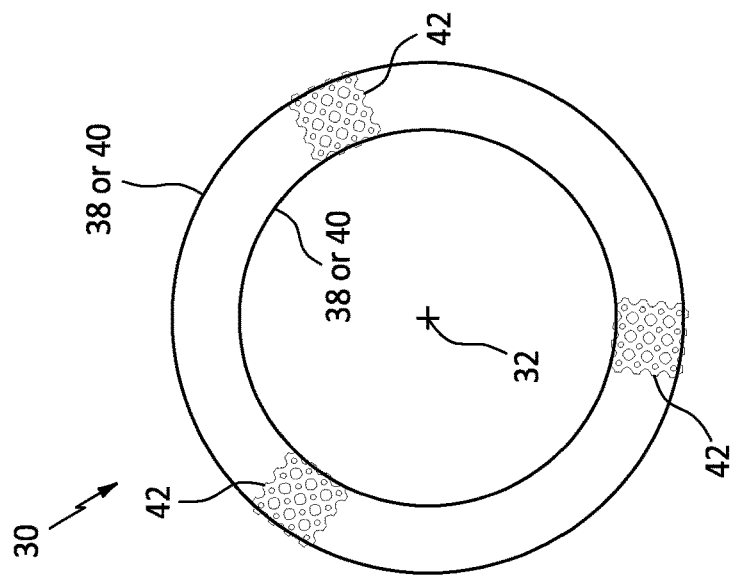
FIGS. 21A-C are cross-sectional illustrations of the combustor wall with various cellular core arrangements.
Figure 21B:
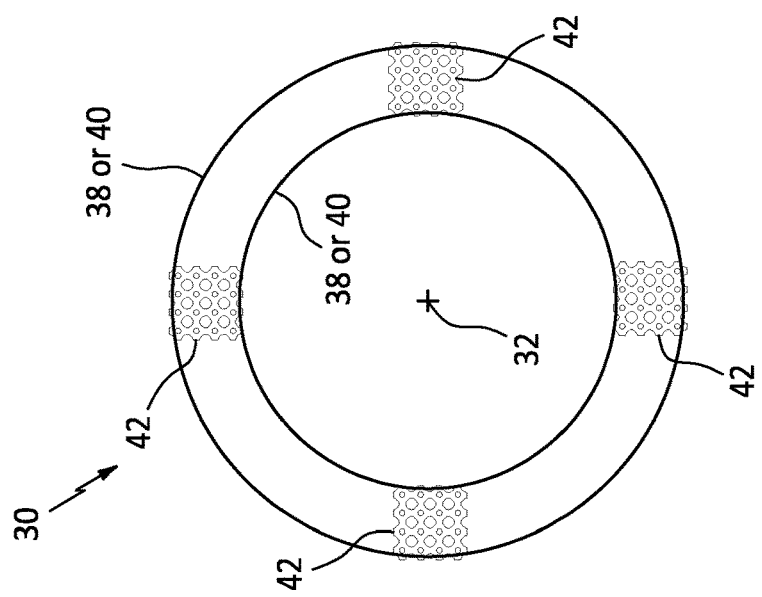
Figure 21A:
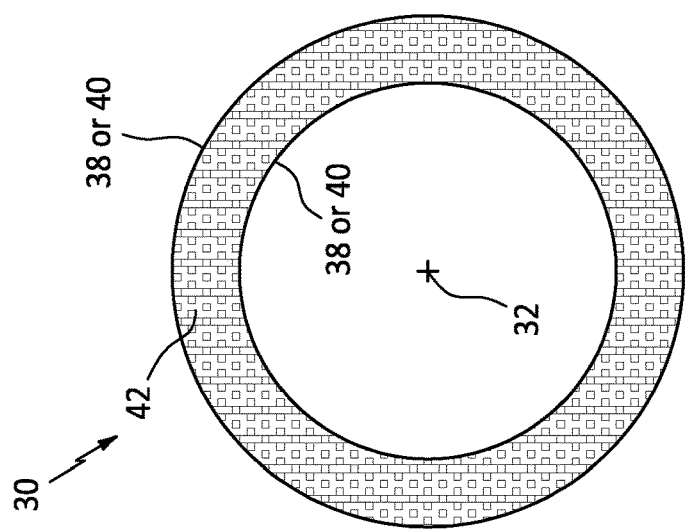

In some embodiments, referring to FIG. 21A, the cellular core 42 may extend along an entirety of the interior skin 38 and/or the exterior skin 40. The cellular core 42 of FIG. 21A, for example, extends completely around the axial centerline 32. In other embodiments, referring to FIGS. 21B and 21C, the cellular core 42 may extend partially along the interior skin 38 and/or the exterior skin 40. The combustor wall 30 of FIGS. 21B and 21C, for example, includes one or more cellular cores 42 arranged in an array. The cellular cores 42 of FIGS. 21B and 21C are distributed circumferentially about the axial centerline 32, where each cellular core 42 is (e.g., circumferentially) spaced from its neighboring cellular core(s) 42 by a gap. This gap may be an empty volume or filled with another structure or material.

Figure 22:
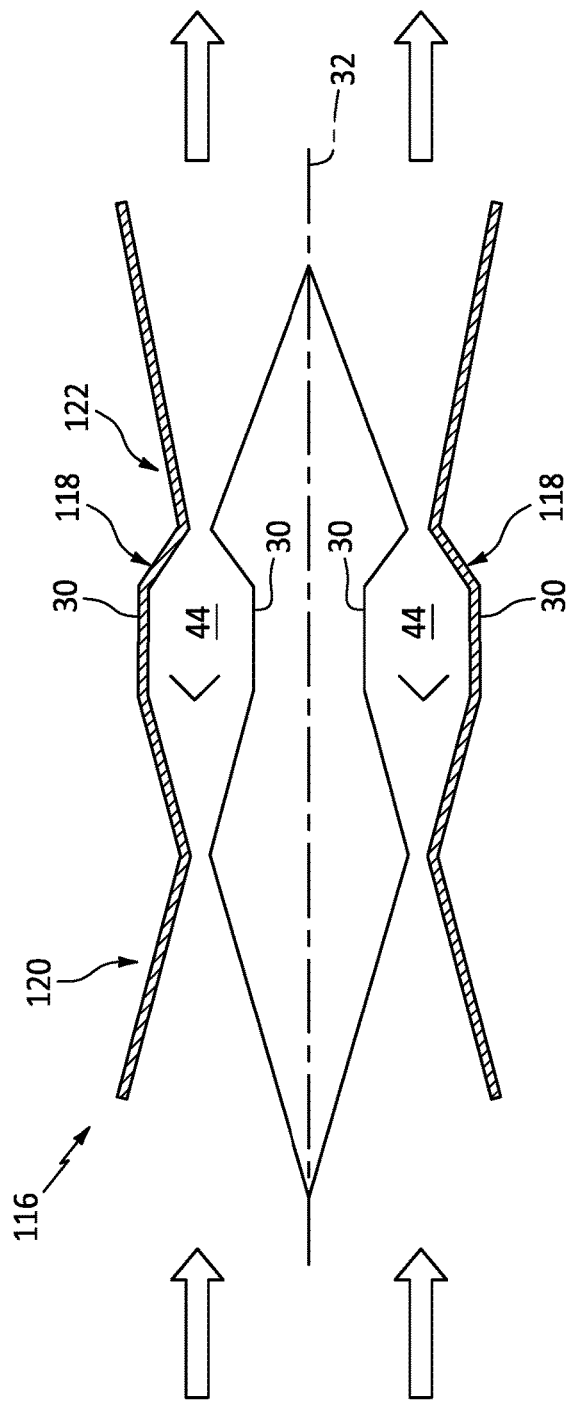
FIG. 22 is a schematic sectional illustration of a ramjet engine.

FIG. 22 illustrates a ramjet engine 116 with an annular ramjet combustor 118. This combustor 118 may be configured with one or more of the combustor walls 30 described above to form its combustion volume 44. During operation, air enters the ramjet engine 116 at a supersonic velocity. This air is compressed and accelerated by a convergent compressor section 120. The compressed air is then diffused and decelerated to a subsonic velocity before entering the combustor 118 and its combustion volume 44. The compressed air is mixed with fuel. This fuel-air mixture is ignited, and combustion products are accelerated via a convergent-divergent nozzle 122 back to a supersonic velocity before being directed out of the ramjet engine 116 to provide forward engine thrust.

Figure 23:
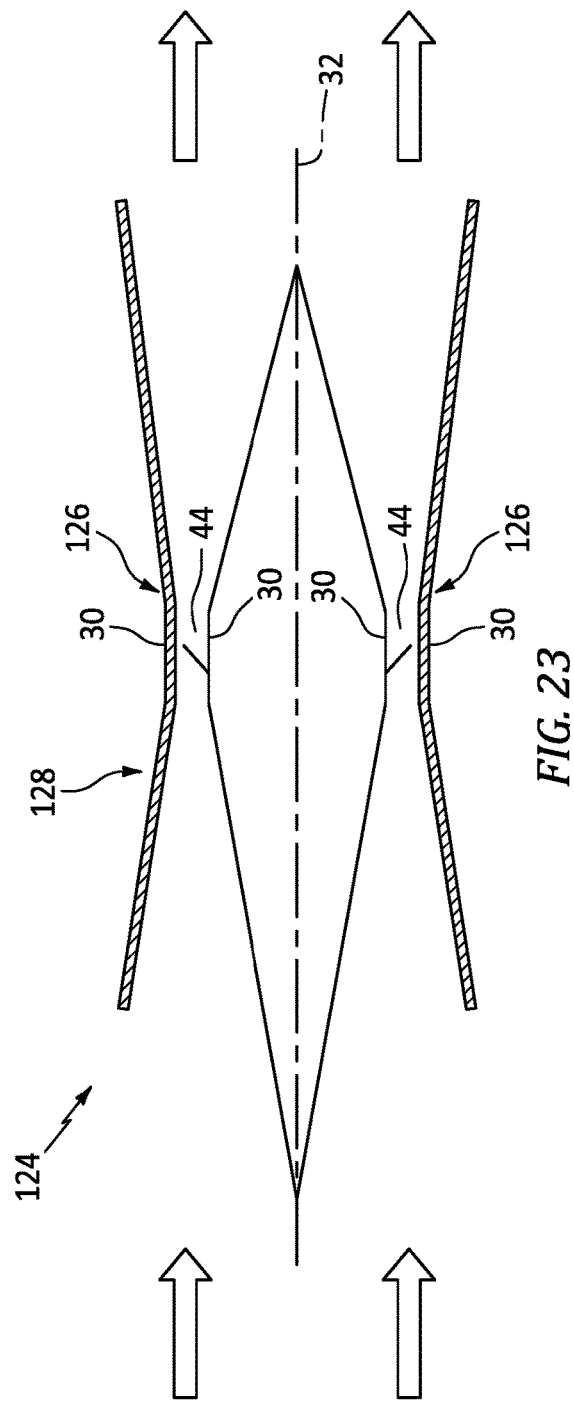
FIG. 23 is a schematic sectional illustration of a scramjet engine.

FIG. 23 illustrates a scramjet engine 124 with an annular scramjet combustor 126. This combustor 126 may be configured with one or more of the combustor walls 30 described above to form its combustion volume 44. During operation, air enters the scramjet engine 124 at a supersonic velocity. This air is compressed and accelerated by a convergent compressor section 128. The compressed air is decelerated to a lower supersonic velocity before entering the combustor 126 and its combustion volume 44. The compressed air is mixed with fuel. This fuel-air mixture is ignited, and combustion products are directed out of the scramjet engine 124 at a supersonic velocity to provide forward engine thrust.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an engine, comprising:
  a combustor wall including a first skin, a second skin, a core and a sound attenuation passage;
  the first skin forming a peripheral boundary of a combustion volume on a first side of the combustor wall;
  the second skin forming a peripheral boundary of a plenum on a second side of the combustor wall;
  the core including a plurality of resonator elements between the first skin and the second skin, the plurality of resonator elements comprising a first resonator element, the first resonator element including a first base and a plurality of first protrusions projecting out from the first base, each of the plurality of first protrusions including a first bore fluidly coupled with a first cavity within the first base; and
  the sound attenuation passage extending within the core and fluidly coupled with the combustion volume through an attenuation passage aperture in the first skin, and the sound attenuation passage fluidly decoupled from the plenum by the second skin;
  wherein the combustor wall further includes a cooling passage extending within the core;
  wherein the cooling passage is fluidly coupled with the combustion volume through a first skin cooling passage aperture in the first skin;
  wherein the cooling passage is fluidly coupled with the plenum by a second skin cooling passage aperture in the second skin;
  wherein the cooling passage extends into the first resonator element; and
  wherein the sound attenuation passage extends next to and outside of the first resonator element.

2. The assembly of claim 1, wherein the sound attenuation passage extends into the first cavity through the first bore of a first of the plurality of first protrusions.

3. The assembly of claim 1, wherein the first resonator element forms a peripheral boundary of the sound attenuation passage outside of the first resonator element.

4. The assembly of claim 1, wherein
  the plurality of resonator elements further comprise a second resonator element that includes a second base;
  a second cavity within the second base is fluidly coupled with the first cavity through the first bore of a second of the plurality of first protrusions; and
  a first centerline of the first of the plurality of first protrusions is parallel with a second centerline of the second of the plurality of first protrusions.

5. The assembly of claim 1, wherein
  the plurality of resonator elements further comprise a second resonator element that includes a second base;
  a second cavity within the second base is fluidly coupled with the first cavity through the first bore of a second of the plurality of first protrusions; and
  a first centerline of the first of the plurality of first protrusions is angularly offset from a second centerline of the second of the plurality of first protrusions.

6. The assembly of claim 1, wherein
  the plurality of resonator elements further comprise a second resonator element that includes a second base;
  a second cavity within the second base is fluidly coupled with the first cavity through the first bore of a second of the plurality of first protrusions;
  the first bore of the first of the plurality of first protrusions has a first size; and
  the first bore of the second of the plurality of first protrusions has a second size that is different than the first size.

7. The assembly of claim 1, wherein
  the sound attenuation passage is a first sound attenuation passage, and the combustor wall further includes a second sound attenuation passage extending within the core;
  the second sound attenuation passage is fluidly coupled with the combustion volume through a second attenuation passage aperture in the first skin; and
  a length of the first sound attenuation passage within the combustor wall is different than a length of the second sound attenuation passage within the combustor wall.

8. The assembly of claim 1, wherein the core extends partially along at least one of the first skin or the second skin.

9. An assembly for an engine, comprising:
  a combustor wall including a first skin, a second skin, a core and a sound attenuation passage;
  the first skin forming a peripheral boundary of a combustion volume on a first side of the combustor wall;
  the second skin forming a peripheral boundary of a plenum on a second side of the combustor wall;
  the core including a plurality of resonator elements between the first skin and the second skin, the plurality of resonator elements comprising a first resonator element, the first resonator element including a first base, a plurality of first protrusions and a second protrusion, the plurality of first protrusions projecting out from the first base, each of the plurality of first protrusions including a first bore fluidly coupled with a first cavity within the first base, and the second protrusion projecting out from the first base and at least one of the plurality of first protrusions; and
  the sound attenuation passage extending within the core and fluidly coupled with the combustion volume through an attenuation passage aperture in the first skin, and the sound attenuation passage fluidly decoupled from the plenum by the second skin.

10. An assembly for an engine, comprising:
a combustor wall including a first skin, a second skin, a core and a sound attenuation passage;
the first skin forming a peripheral boundary of a combustion volume on a first side of the combustor wall;
the second skin forming a peripheral boundary of a plenum on a second side of the combustor wall;
the core including a plurality of resonator elements between the first skin and the second skin, the plurality of resonator elements comprising a first resonator element, the first resonator element including a first base and a plurality of first protrusions projecting out from the first base, each of the plurality of first protrusions including a first bore fluidly coupled with a first cavity within the first base; and
the sound attenuation passage extending within the core and fluidly coupled with the combustion volume through an attenuation passage aperture in the first skin, and the sound attenuation passage fluidly decoupled from the plenum by the second skin;
wherein the first resonator element further includes a second protrusion projecting into at least one of
the first cavity; or
the first bore of a first of the plurality of first protrusions.

11. An assembly for an engine, comprising:
a combustor wall including a first skin, a second skin, a core and a sound attenuation passage;
the first skin forming a peripheral boundary of a combustion volume on a first side of the combustor wall;
the second skin forming a peripheral boundary of a plenum on a second side of the combustor wall;
the core including a plurality of resonator elements between the first skin and the second skin, the plurality of resonator elements comprising a first resonator element, the first resonator element including a first base and a plurality of first protrusions projecting out from the first base, each of the plurality of first protrusions including a first bore fluidly coupled with a first cavity within the first base; and
the sound attenuation passage extending within the core and fluidly coupled with the combustion volume through an attenuation passage aperture in the first skin, and the sound attenuation passage fluidly decoupled from the plenum by the second skin;
wherein the core further includes a plurality of damper elements between the first skin and the second skin, the plurality of damper elements comprising a first damper element;
wherein the first damper element includes a first damper base and a plurality of first damper protrusions projecting out from the first damper base; and
wherein the first damper base is configured with a first mass and a first shell, the first mass is within the first damper base and embedded within the first shell.

12. The assembly of claim 11, wherein the first shell forms a peripheral boundary of the sound attenuation passage outside of the first damper element.

13. The assembly of claim 11, wherein
the plurality of damper elements further include a second damper element;
the second damper element includes a second damper base and a plurality of second damper protrusions projecting out from the second damper base;
the second damper base is configured with a second mass and a second shell, the second mass is within the second damper base and embedded within the second shell; and
a size of the first mass is different than a size of the second mass.

* * * * *